United States Patent
Riedel et al.

(10) Patent No.: US 7,289,453 B2
(45) Date of Patent: Oct. 30, 2007

(54) ADAPTIVE QUALITY-OF-SERVICE RESERVATION AND PRE-ALLOCATION FOR MOBILE SYSTEMS

(75) Inventors: Matthias Riedel, Stuttgart (DE); Xue Jianbo, Zurich (CH)

(73) Assignee: Sony Deutschland GmbH, Cologne (DE)

( * ) Notice: Subject to any disclaimer, the term of this patent is extended or adjusted under 35 U.S.C. 154(b) by 1109 days.

(21) Appl. No.: 10/316,732

(22) Filed: Dec. 12, 2002

(65) Prior Publication Data

US 2003/0112766 A1 Jun. 19, 2003

(30) Foreign Application Priority Data

Dec. 13, 2001 (EP) .................................. 01129744

(51) Int. Cl.
*H04J 1/16* (2006.01)
(52) U.S. Cl. ...................... 370/252; 370/329; 709/224; 709/232
(58) Field of Classification Search ................ 370/409, 370/252, 329; 709/224, 232
See application file for complete search history.

(56) References Cited

U.S. PATENT DOCUMENTS

2003/0074443 A1* 4/2003 Melaku et al. ............... 709/224

FOREIGN PATENT DOCUMENTS

EP 1 211 851 6/2002

OTHER PUBLICATIONS

Lee S et al: "Insignia: an IP-based quality of service framework for mobile and hoc networks" Journal of Parallel and Distributed Computing, Apr. 2000, Academic Press, USA, vol. 60, No. 4, Apr. 2000, pp. 374-406, XP002206200.

Talukdar A K et al: "MRSVP: A Resource Reservation Protocol for an Integrated Services Network with Mobile Hosts" Wireless Networks, 2001, Kluwer Academic Publishers, Netherlands, vol. 7, No. 1, Jan. 2001, pp. 5-19, XP002206201.

Tseng C et al: "HMRSVP: A Hierarchical Mobile RSVP Protocol" Proceedings 21st International Conference on Distributed Computing Systems Workshops, Mesa, AZ, USA, Apr. 16-19, 2001, pp. 467-472, XP002206202.

* cited by examiner

*Primary Examiner*—John Pezzlo
(74) *Attorney, Agent, or Firm*—Oblon, Spivak, McClelland, Maier & Neustadt, P.C.

(57) ABSTRACT

In the field of Quality-of-Service (QoS) management for adaptive real-time services running on mobile devices which support different access technologies in dynamic wireless Internet Protocol (IP) networks, the connectivity of the applied nodes is unpredictable time-varying. In this context, a QoS management unit (304) is proposed that allows adaptive applications with real-time requirements in typical mobile wireless scenarios—e.g. a radio link with a changing transmission quality and handover procedures (2900)—to adaptively and responsively react to a time-varying network topology and different radio link characteristics. Said QoS management unit (304) provides methods of pre-allocating, reserving, monitoring and adapting QoS-related parameters in a dynamic mobile environment.

The QoS management unit (304) comprises at least one analysis unit (306) which evaluates QoS requests received from other nodes (402*a/b*, 404) to inform the application unit (328) of said mobile terminal (208) about the current QoS situation, at least one processing unit (312) that manages request messages (1200, 2000, 2400) for each type of QoS request, at least one monitoring unit (318) which monitors the current QoS situation within said mobile node (208) and initiates requests by activating the processing unit (312), and at least one generation unit (322) which is responsible for generating QoS requests or passing them on to the QoS management units (304) of other nodes (402*a+b*, 404).

12 Claims, 25 Drawing Sheets

Bandwidth request object fields
1.1 Max BW: Maximum Bandwidth } 802a
1.2 Set BW: Set Bandwidth
2 Min BW: Minimum Bandwidth — 802b
3 Actual BW: Actually Reserved Bandwidth — 804b AvBW: Available Bandwidth at the node —1304
AcBW: Actual Bandwidth field —804b
MaxBW: Maximum Bandwidth field —802a
MinBW: Minimum Bandwidth field —802b
SR: Amount of "soft" reserved bandwidth —1302a
HR: Amount of "hard" reserved bandwidth —1302b AvBW: Available Bandwidth at the node —1304
AcBW: Actual Bandwidth field —804b
MaxBW: Maximum Bandwidth field—802a
MinBW: Minimum Bandwidth field—802b
SR: Amount of "soft" reserved bandwidth—1302a
HR: Amount of "hard" reserved bandwidth—1302b AvBW: Available Bandwidth at the node —1304
AcBW: Actual Bandwidth field —804b
MaxBW: Maximum Bandwidth field —802a
MinBW: Minimum Bandwidth field —802b
SR: Amount of "soft" reserved bandwidth —1302a
HR: Amount of "hard" reserved bandwidth —1302b AvBW: Available Bandwidth at the node —1304
AcBW: Actual Bandwidth field —804b
MaxBW: Maximum Bandwidth field —802a
MinBW: Minimum Bandwidth field —802b
SR: Amount of "soft" reserved bandwidth —1302a
HR: Amount of "hard" reserved bandwidth —1302b MN: Mobile Node — 208
AP: Access Point — 204a/b/c

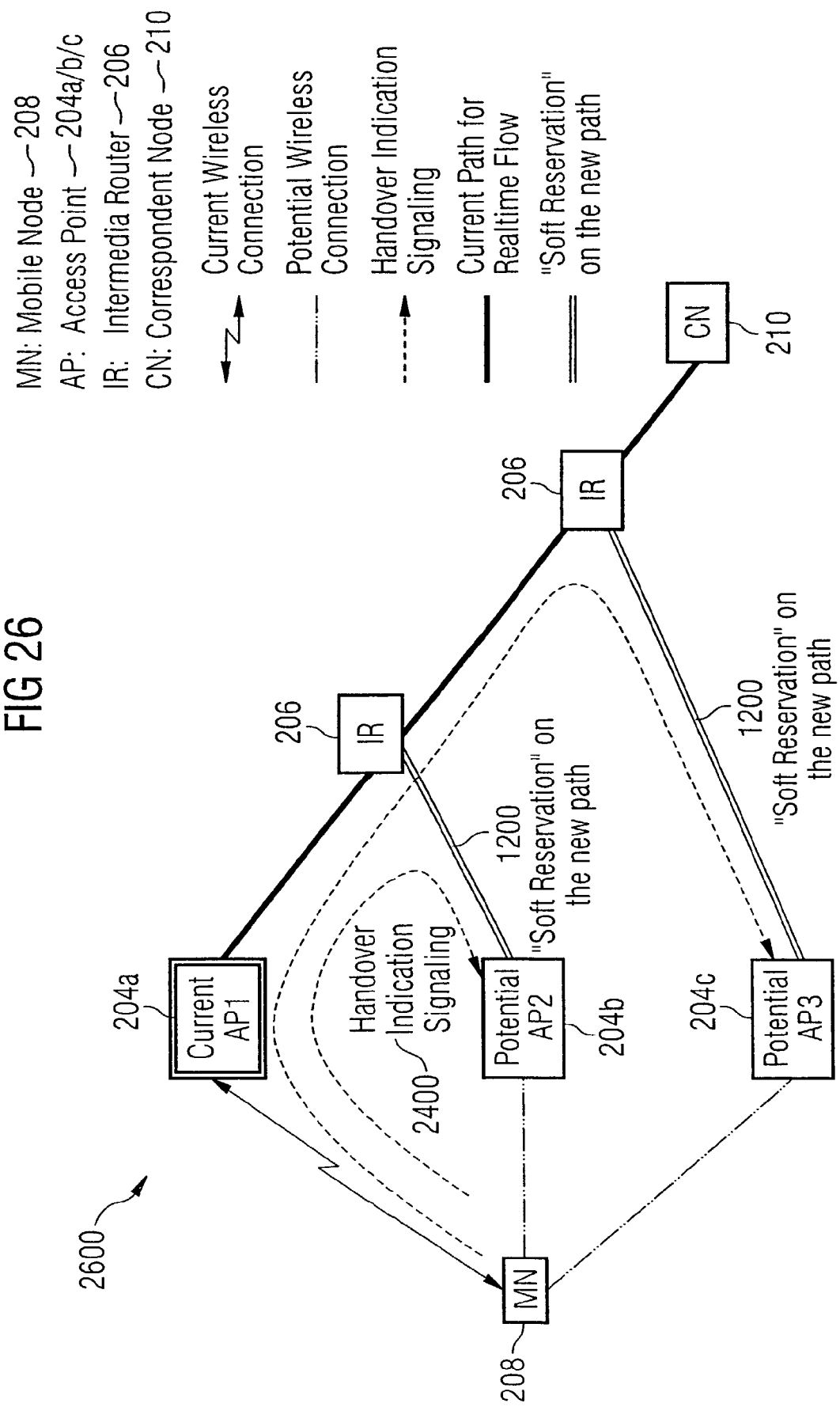

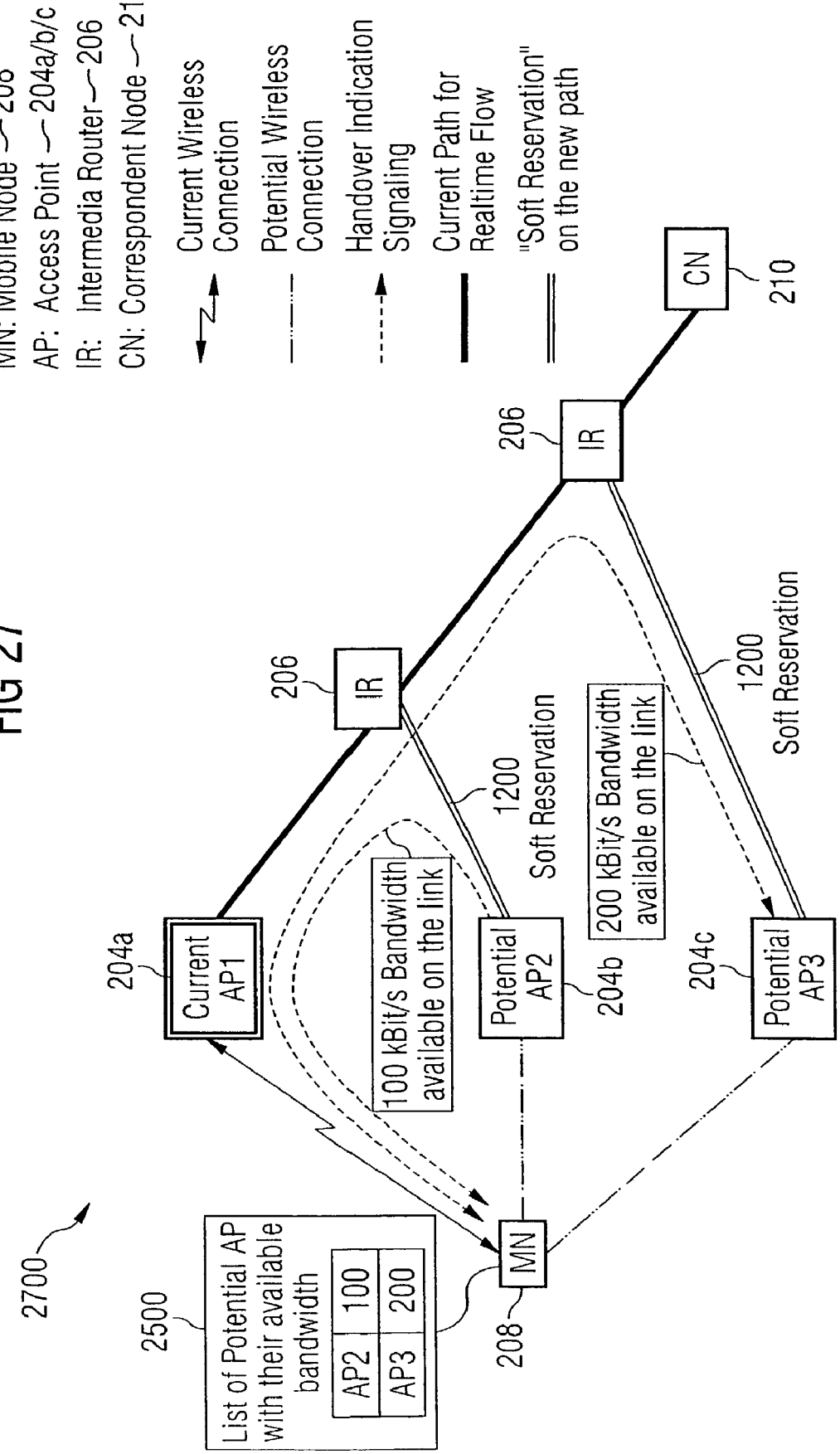

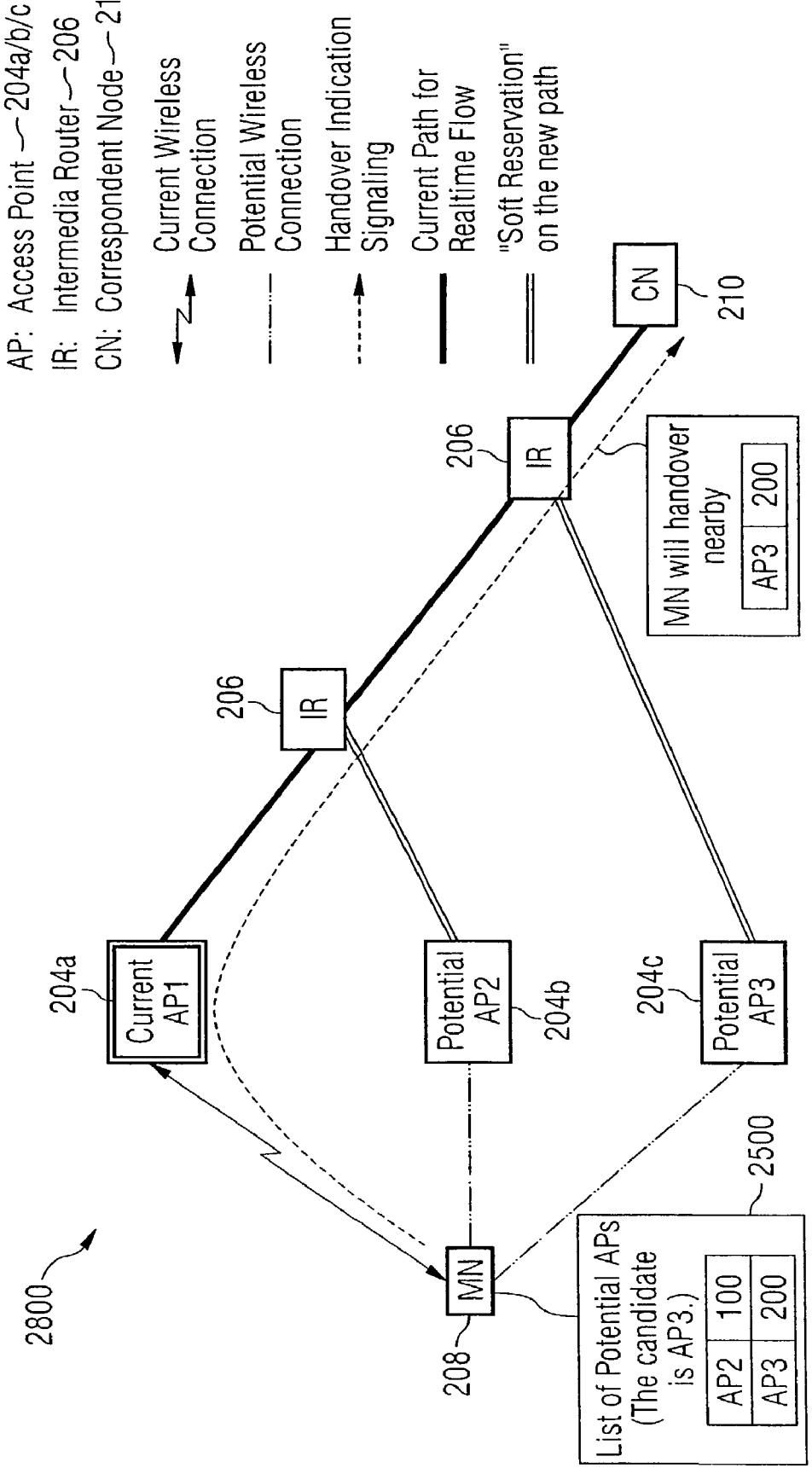

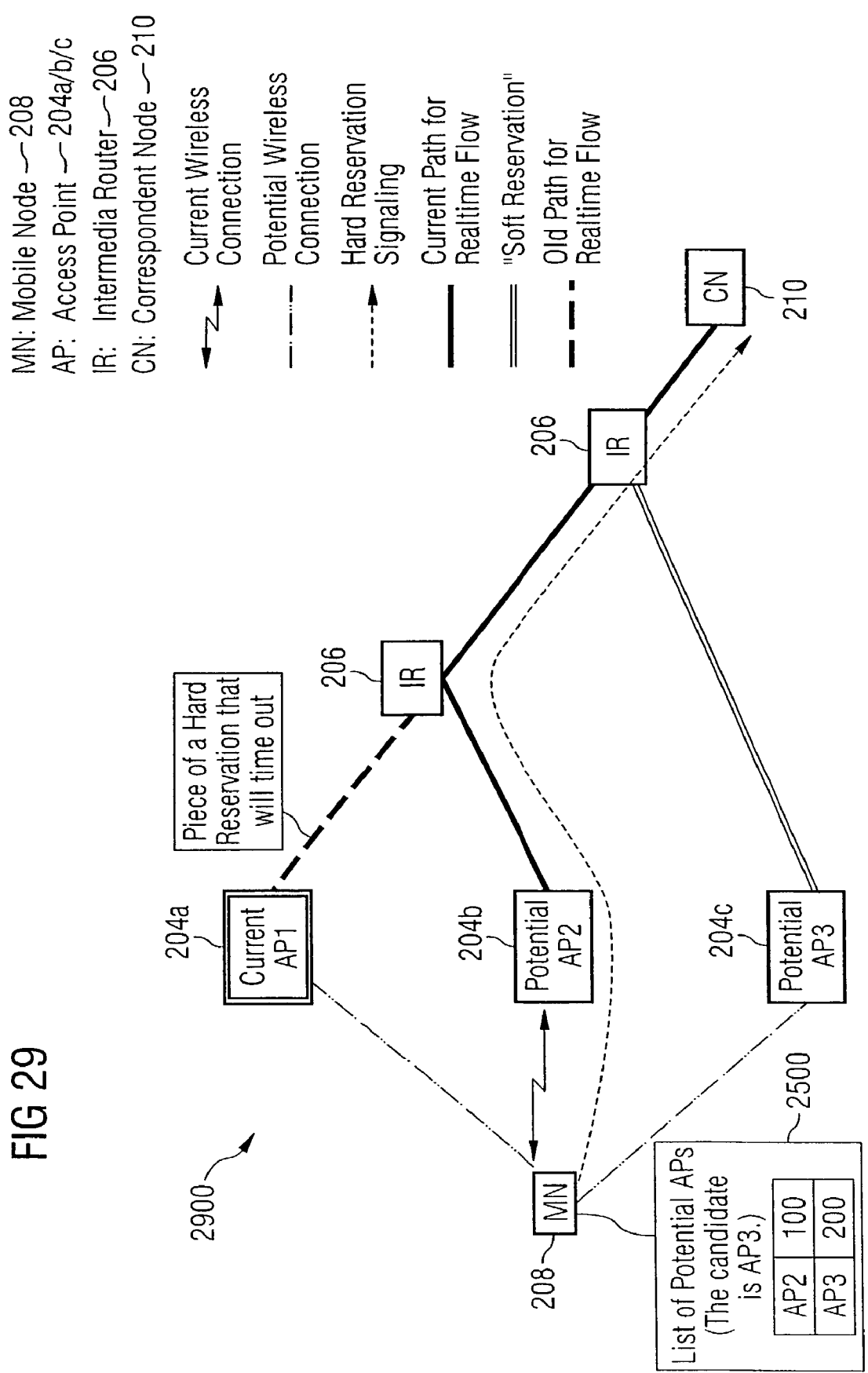

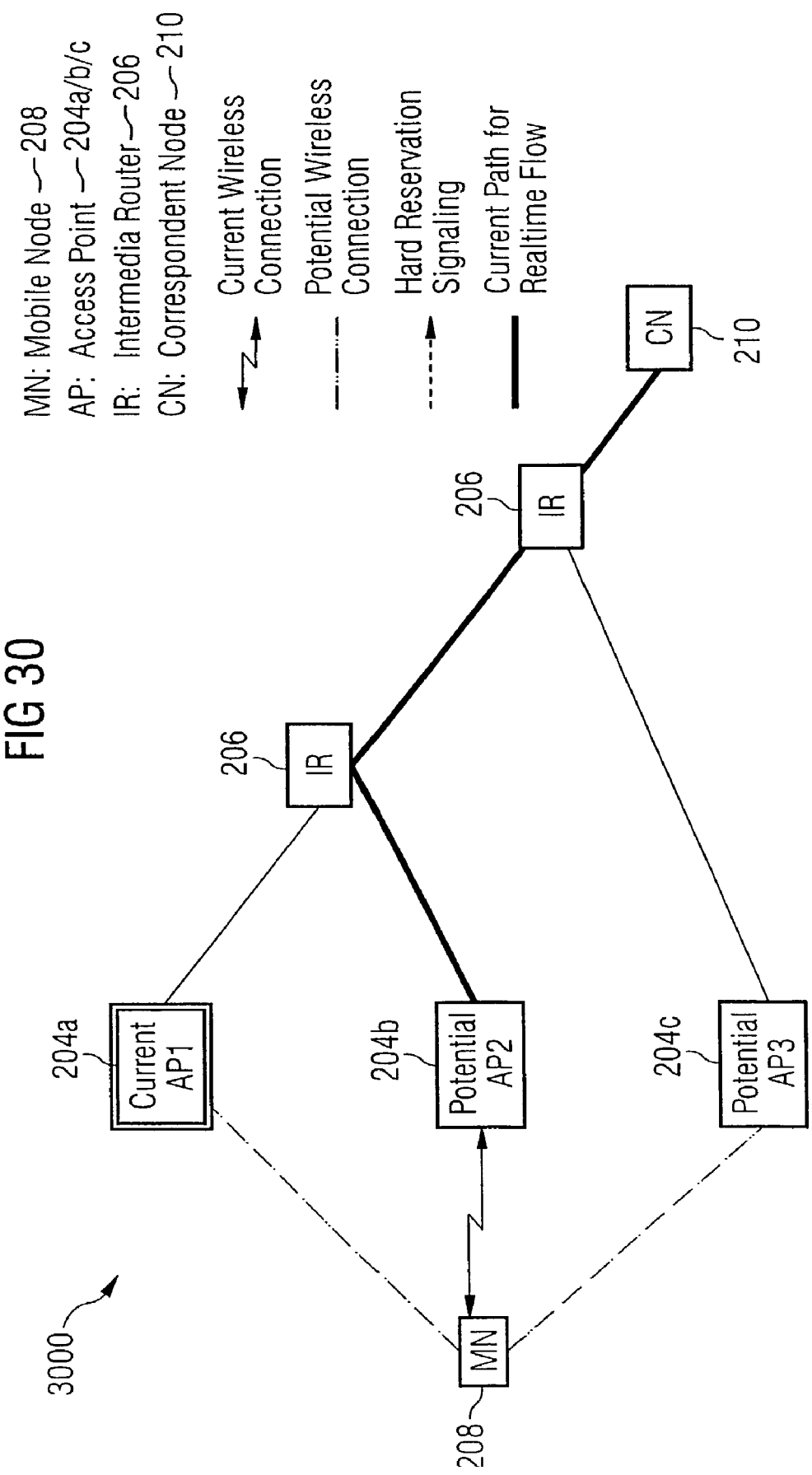

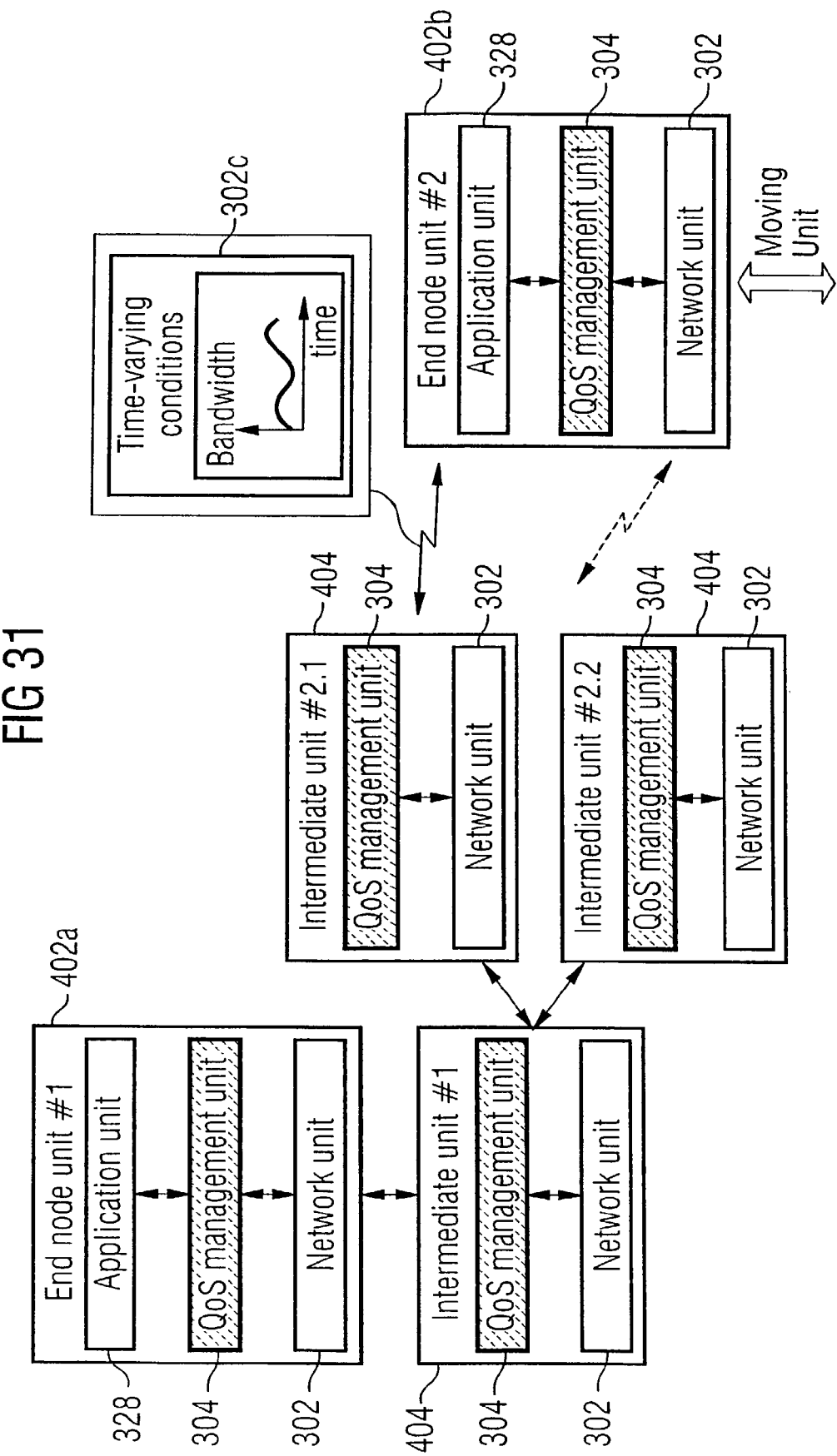

FIG 32

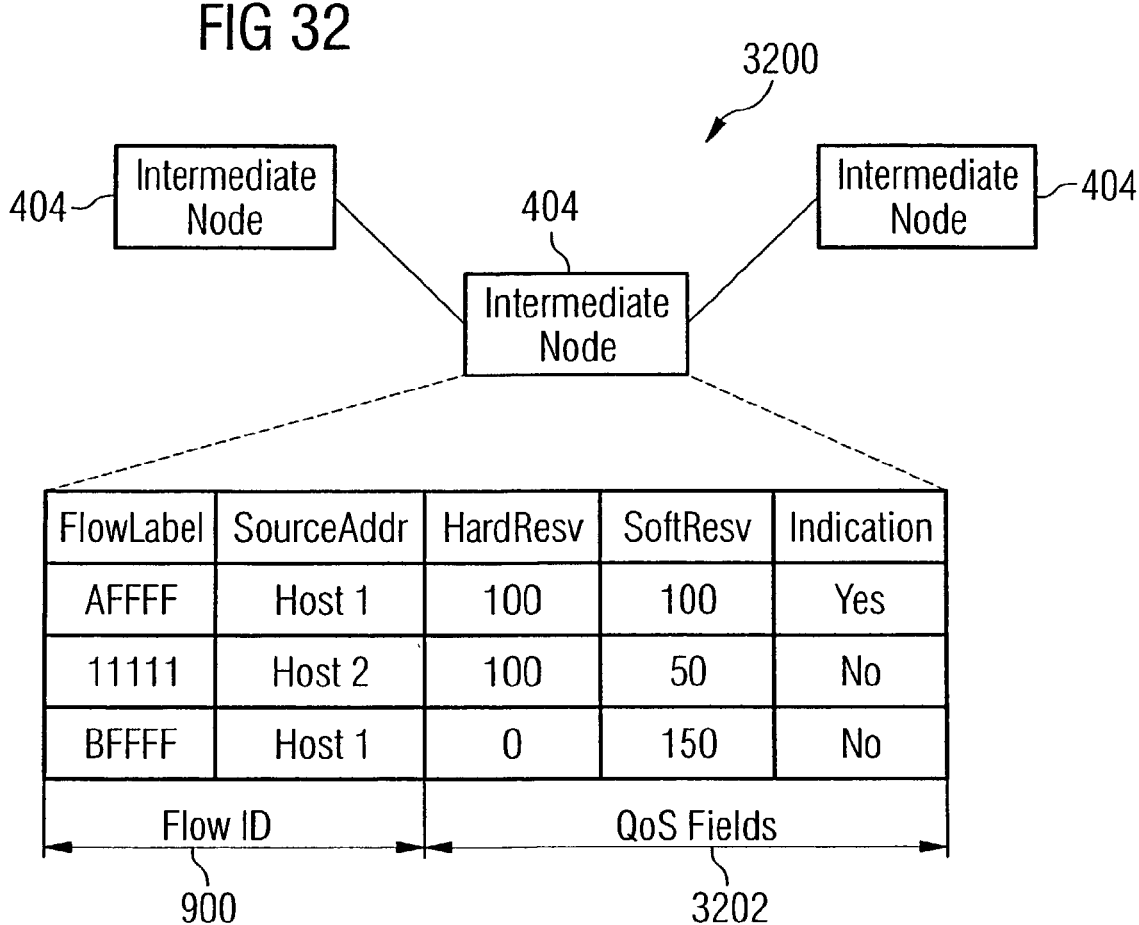

FlowLabel: 20-bit field defined in the IPv6 header —902b
SourceAddr: Source Address field in IPv6 header —904
Flow ID: the combination of FlowLabel 902b and SourceAddress 904 which can uniquely identify a specific flow
HardResv: the amount of hard-reserved bandwidth for —1302b the specific flow in this intermediate node
SoftResv: the amount of soft-reserved bandwidth —1302a
Indication: to indicate whether the total reserved bandwidth fulfills —3201 the Max BW requirement of this flow. E.g., for flow "11111" the total bandwidth of 150 kBit/s has been "soft" reserved. The "Indication" field is marked as "No". This shows that the Max BW demand was not fulfilled at the node.

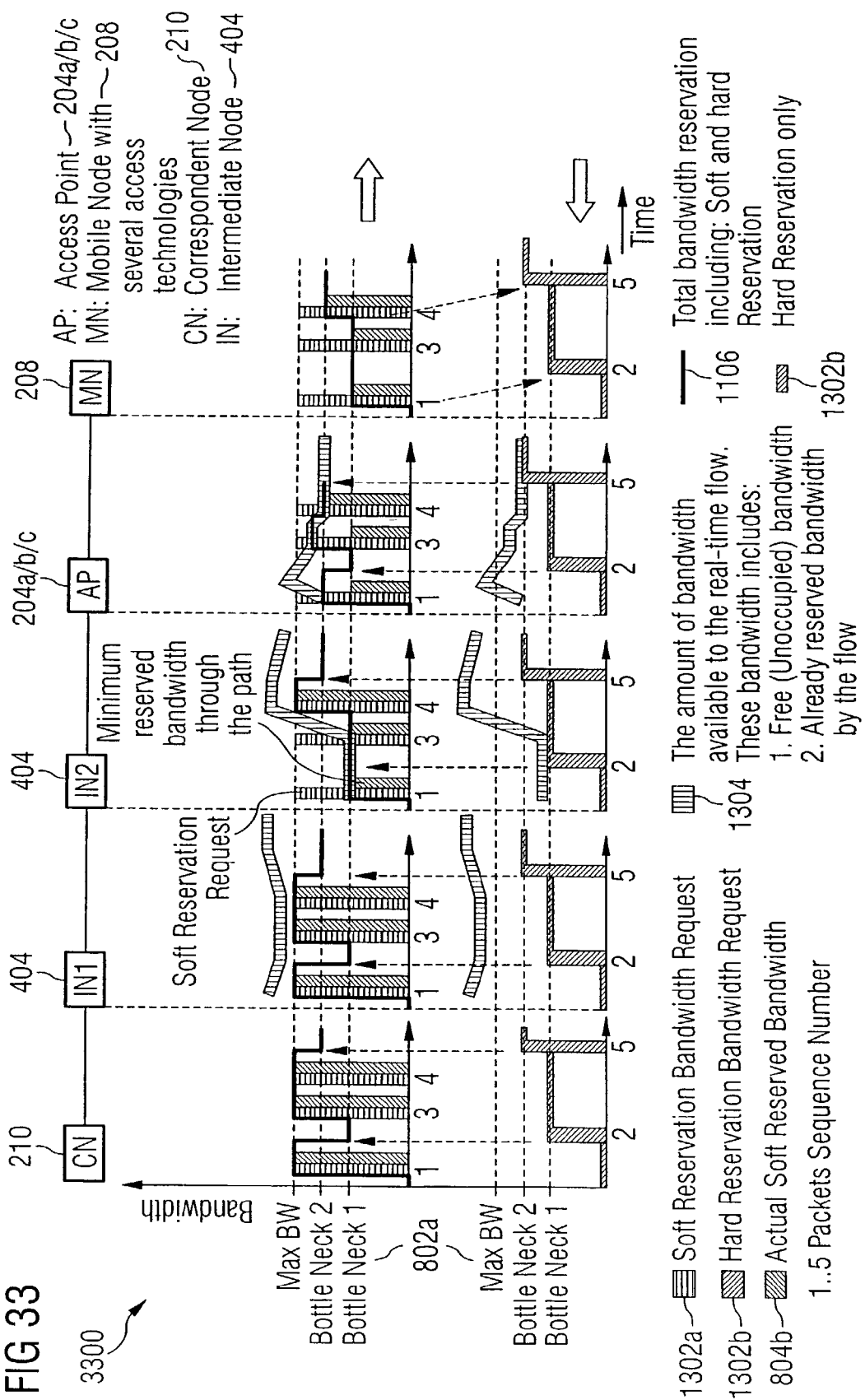

ADAPTIVE QUALITY-OF-SERVICE RESERVATION AND PRE-ALLOCATION FOR MOBILE SYSTEMS

The underlying invention generally relates to mobile computing in a wireless mobile networking environment. More specifically, it is directed to the field of Quality-of-Service (QoS) management for adaptive real-time services running on mobile devices which support different access technologies in dynamic wireless Internet Protocol (IP) networks, where the connectivity of the applied nodes is unpredictable time-varying. In this context, a QoS management unit is proposed that allows adaptive applications with real-time requirements in typical mobile wireless scenarios (e.g. a radio link with a changing transmission quality and handover procedures) to adaptively and responsively react to a time-varying network topology and different radio link characteristics. Said QoS management unit provides methods of pre-allocating, reserving, monitoring and adapting QoS-related parameters in a dynamic mobile environment.

Real-time audio, video and data services for mobile devices like Personal Digital Assistants (PDAs), mobile phones or wearable computers will become ubiquitous available in the near future. However, the introduction of these time-sensitive services into mobile IP networks often involves a number of technical problems since conventional multimedia applications exhibit a diverse and unpredictable performance due to the time-varying nature of resource availability, node connectivity and end-to-end QoS in mobile networks. On the one hand, a broadband radio channel needed for a transmission of high data rates is characterized by severe attenuation fades (frequency-selective fading) caused by multipath propagation of the transmitted mobile radio signals. Thereby, the wireless environment is typically characterized by a plurality of scattering processes and the absence of direct line of sight (LOS) paths between base stations (BS) and mobile stations (MS). On the other hand, the mobile radio channel exhibits a time-variant behavior due to the mobility of mobile nodes (MNs), which requires a continuous adaptation of the transmission system to said behavior. In TDMA systems, for example, the quality of a transmission is severely impaired by attenuation, distortions and fluctuations caused by the mobile radio channel.

Especially real-time services like Voice-over-IP (VoIP) are very sensitive to bandwidth degradation, delay and jitter variations. A mobile user immediately feels the negative effects during a VoIP phone conference (e.g. a degradation in speech quality or interruptions). Therefore, there is a need for supporting these services by means of network algorithms which have to be adaptive and responsive to the time-varying resource availability of the wireless radio link.

In this context, the design of mobile applications requires a careful consideration of QoS monitoring and resource management issues to provide end-to-end QoS guarantees for a large number of applications. Thereby, the presentation quality, varying network load and stringent real-time requirements of continuous media streams require a relatively high utilization of networking bandwidth and processing power in the end systems. In the following, a number of possible approaches and concepts shall be described which are necessary to cope with problems a mobile user in a wireless mobile networking environment is faced with.

To date, much work on QoS management has been done in the context of high-speed networks offering Asynchronous Transfer Mode (ATM) in order to guarantee a specific QoS for the provided communication service characterized by the bandwidth of different media stream and the delay, delay jitter and packet loss rate provided by the network. Further QoS application requirements include:
  performance requirements (e.g. timeliness of execution and relative processing speed requirements),
  reliability requirements (e.g. high availability and relative failure recovery requirements), and
  security requirements (e.g. authentication and privacy).

The availability of operating system mechanisms for increased monitoring of and control over system utilization (e.g. fair-share CPU scheduling and QoS-aware network protocols) suggests a way for providing predictable application performance. Resource-aware applications, which proactively monitor and control an utilization of the underlying platform, can ensure a desired performance level by adapting themselves to changing resource characteristics. For instance, a multimedia application conveying a video stream from a server to a client can respond to a reduction of the available network bandwidth by compressing the stream or selectively dropping frames.

QoS data flows have to be rapidly established, restored, adapted and released in response to wireless impairments and topology changes. The complexity of existing protocols often does not fulfill these requirements. For this reason, there is a need for a signaling approach that transmits control information in an effective way to manage reservation flow state in mobile networks.

To enhance QoS support of real-time applications during the handover phases, resource reservation has to be installed on a new path, before the MN gets attached to it. Due to the difficulty to predict the movement of MNs, said resource reservation could take place on all the potential paths the MN might choose. However, this concept is associated with a big waste of resources during the handover. At the end of said handover, the MN is associated with only one path. All the other unused resources which have been reserved are wasted. To overcome the problem of wasting resources and to achieve a better network utilization, there is the need of a flexible resource reservation concept.

Another problem that occurs in wireless, mobile communication networks is that the moving node has to handover from one access point to another in order to keep the connection to the fixed network. Handovers between access routers and contention about resources among mobile users means that a new end-to-end QoS path has to be negotiated among peers. In case the re-establishing of new QoS path is not fast enough, the result could be an intermittent service disruption. This could cause significant packet loss and packet delays to the QoS data flow. The success of time-sensitive services in such an environment heavily depends on the ability to minimize the impact of the traffic rerouting during a change of packet forwarding path. To minimize the impact of the traffic rerouting, there is the need to perform the following actions:
  Allocating resources in advance along the best available QoS path to the new access point before the handover itself occurs: In the process of establishing the new forwarding path, the nodes along the new path must be prepared to provide similar forwarding treatment to the IP packets, which gives users the flexibility to take different QoS contracts from different providers or access technologies into account.
  Informing the running applications about an upcoming handover event.
  Announcing the QoS parameters that can be expected after the handover is finished: This is an essential feature to support adaptive applications.

BRIEF DESCRIPTION OF THE PRESENT STATE OF THE ART

According to the state of the art, different methods and technologies are currently available concerning QoS management in mobile environments, which are closely related to the topic of the underlying invention. In order to understand the context of the invention, it is necessary to briefly explain the main features involved with said technologies.

Configurable and tailorable programs according to the state of the art can be adapted to their hardware and operating system environment, e.g. to the available memory size, the presence of a floating-point coprocessor, or the I/O environment. These programs often automatically recognize the available resources; if not, an adaptation is done manually at installation time. Other types of adaptivity include option negotiation for recognizing the parameters of remote components (such as terminals and modems), and program reconfigurability in fault-tolerant systems. Furthermore, error detection and correction in conventional communication protocols can be considered as mechanisms to adapt these protocols to changing transmission QoS.

As described in "Network Element Service Specification Template" (IETF RFC 2216, September 1997) by S. Shenker and S. Wroclawski, different QoS reservation concepts are offered to mobile users today. The term "quality of service" (QoS) refers to the nature of the provided packet delivery service, as described by parameters such as the currently achieved bandwidth, packet delay, and packet loss rates. Traditionally, the Internet offers a single QoS, best-effort delivery, in which the available bandwidth and delay characteristics depend on the instantaneous load. The control over QoS seen by applications is exercised by an adequate provisioning of the underlying network infrastructure. In contrast, a network with dynamically controllable QoS parameters allows individual application sessions to request network packet delivery characteristics according to their perceived needs. Moreover, it may provide different qualities of service to different applications.

Today, the processing of multiple streams is generally facilitated by means of a resource sharing, managed by the operating system. This results in the potential to offer a wide range of QoS properties that define both how the end-user perceives the multimedia information and how the operating system should manage the associated end system and network resources. This characteristic is important since there is a finite limit to the number of multimedia streams the end system and network resources can successfully handle. Therefore, when end system or network resources are stretched to near capacity, policies, defined by either the end-user or an administrator, are used to automate share balancing.

Many multimedia data types, particularly video, are processed and rendered by specialized end system devices. In parallel with the progression of multimedia, there have also been extensive advances in network communications technology. Fast-Ethernet (100 MBit/s) and Gigabit-Ethernet now enable relatively inexpensive communication in the field of Local Area Networks (LANs). Asynchronous Transfer Mode (ATM) technologies offer a variety of network bandwidths from 25 MBit/s to the desktop and 2.4 GBit/s in the backbone. Besides, ATM can provide firm QoS guarantees on network traffic catering for media types that are resource-sensitive, such as audio and video. Combined together, the advances in multimedia and network communications enable the deployment of sophisticated distributed multimedia applications. A deployment of interactive tele-vision, electronic publishing, tele-shopping, tele-medicine, tele-education, entertainment and gaming applications is now feasible.

For QoS-enabled IP networks, there are two main streams, namely Integrated Services (IntServ) with its accompanying signaling (Resource) Reservation Setup Protocol (RSVP) and differentiated services (DiffServ) as described in "An Architecture for Differentiated Services" (IETF RFC 2475, December 1998) by S. Blake, D. Black, M. Carlson, E. Davies, Z. Wang and W. Weiss. Said differentiated services provide an aggregation of reservations for similar QoS data flows, without any signaling. Therefore, DiffServ networks classify packets into one out of a small number of aggregated QoS data flows or "classes", based on the so-called DiffServ Code Point (DSCP).

The integrated services architecture mentioned above defines a set of extensions to the traditional best-effort model of the Internet with the object to provide applications with end-to-end QoS. The RSVP as described in "Resource Reservation Protocol (RSVP)—Version 1: Functional Specification" (IETF RFC 2205, September 1997) by R. Bradon et al. is an end-to-end control protocol, forming the signaling part of the integrated services architecture. The Internet Architecture Board (IAB) has outlined issues related to these two architectures which can be taken from "Next Steps for the IP QoS Architecture" (IETF RFC 2990, November 2000) by G. Huston.

RSVP is a signaling protocol which enables the applications to signal per-flow requirements to the network. Thereby, the reservation is receiver-initiated and the aggregation of said reservations is supported depending on the needs of the respective application. A QoS data flow may have multiple senders, and the protocol supports different reservation styles to dictate how to aggregate reservations for different senders. RSVP performs a simple reservation and maintains a soft-state resource management in the network. Two important message types used by RSVP are "path" and "reserve". Each data source periodically sends a "path" message that sets up the path state at the routers along the path from the sender to the receiver. The receiver of each QoS data flow periodically sends a "reserve" message. The "reserve" message sets up a reservation state at the IRs along the reverse path from the receiver to the sender. Thereby, RSVP assumes a fairly stable path across the network.

QoS monitoring and adaptation can be understood as an enhancement of pure QoS reservation. INSIGNIA, an IP-based QoS framework as described in "INSIGNIA: An IP-based Quality-of-Service Framework for Mobile Ad-hoc Networks" (Journal of Parallel and Distributed Computing, Vol. 60 No. 4, pp. 374-406, April 2000) by Lee et al. is one candidate that supports adaptive services in mobile ad-hoc networks. Said framework is based on an in-band signaling and a soft-state resource management approach which is designed to satisfy both mobility and end-to-end QoS requirements in dynamic environments, in which network topology, node connectivity and end-to-end QoS are time-varying. Moreover, INSIGNIA supports fast reservation, restoration, and end-to-end adaptation. However, INSIGNIA is not yet supported in any existing router implementation.

The Mobile Resource Reservation Setup Protocol (MRSVP) as described in "MRSVP: A Resource Reservation Protocol for an Integrated Services Network with Mobile Hosts" (Department of Computer Science, Technical Report, DCS-TR-337, Rutgers University, USA, July 1997) by A. K. Talukdar, B. R. Badrinath and A. Acharya supports two types of reservations—active and passive reservations.

Passive reservation: In this case, the bandwidth of the passive reservations can be used by other QoS data flows that might require weaker QoS guarantees or best-effort services.

Active reservation: In case that the passive reservation has to be activated, QoS data flows that currently use said bandwidth may be affected.

Thereby, a mobile host makes an active reservation to its current location and passive reservations to all other locations it might visit.

Another issue is the question whether a network state is a soft or a hard state. RSVP uses the concept of a soft-state resource management. As described in "Resource Reservation Protocol (RSVP)—Version 1: Functional Specification" (IETF RFC 2205, September 1997) by R. Bradon et al. and "RSVP: A New Resource ReSerVation Protocol" (IEEE Network, September 1993) by L. Zhang, S. Deering, D. Estrin, S. Shenker and D. Zappala, a soft state exists only as long as periodic messages are sent along the data path. If said messages fail to arrive at some nodes of said network, the soft state is removed. Compared to the soft state, the hard state is applied at the expense of more complicated releasing of resources, especially in the case of failures.

A context transfer protocol transfers the state information about the QoS requirements of a MN during handover from an old to a new access point. This exchange is triggered by "handover indications" received from the Data Link Layer (layer 2).

The development of said protocol is part of the work of the Internet Engineering Task Force (IETF) Seamoby working group (http://www.ietf.org/html.charters/seamoby-charter.html). Within the Seamoby working group, context transfers are discussed in a wider term, including security information and header compression as well as QoS-related information. At the current state, there is no protocol released by the IETF Seamoby working group addressing the above mentioned goals.

OBJECT OF THE UNDERLYING INVENTION

In view of the explanations mentioned above, it is the object of the underlying invention to propose a method of QoS management for adaptive real-time services running on mobile devices which support different access technologies in dynamic wireless Internet Protocol (IP) networks, where the connectivity of the applied nodes is unpredictable time-varying.

This object is achieved by means of the features of the independent claims. Advantageous features are defined in the dependent claims. Further objects and advantages of the invention are apparent in the following detailed description.

SUMMARY OF THE INVENTION

The proposed solution is basically dedicated to an adaptive QoS management unit running on mobile nodes (MNs) targeted to support adaptive real-time applications to dynamically adapt to a time-varying node connectivity and different radio link characteristics. It supports different access technologies in dynamic wireless Internet Protocol (IP) networks by giving services the possibility to pre-allocate, reserve, monitor and adapt different QoS-related parameters.

In this context, the proposed solution according to the underlying invention can advantageously be applied to solve the following problems:

a) Allowing adaptive applications with real-time requirements in typical mobile wireless scenarios to adaptively and responsively react to the time-varying resource availability of the end-to-end QoS path, especially the wireless link: In this context, it can be applied to dynamically set and change QoS parameters along the QoS path and react to QoS violations. Therefore, adaptive services are supported with actual feedback of QoS-dependent network information.

b) Carrying control information in an effective way in order to manage reservation flow state in mobile network environments by an in-band signaling approach: Since it is able to carry control information in the IP packet header, said in-band signaling approach can advantageously be used to manage reservation flow state in mobile networks.

c) Furthermore, the proposed solution according to the underlying invention can be used to overcome the problem of wasting resources and to achieve a better network utilization by defining the concepts of "soft reservation" and "hard reservation".

d) Besides, it can be applied to minimize the impact of the traffic redirection during a change of the packet forwarding path by pre-allocating resources along the best available QoS path to the new access point before the handover occurs.

e) Moreover, it can be employed to inform running applications about an upcoming handover event by handover reservation requests.

f) Finally, a conceivable application of the underlying invention is to announce the QoS parameters that can be expected after a handover is finished to the applications by QoS parameters delivered within a handover reservation request.

Thereby, the desired QoS model should be able to provide the following features:

QoS monitoring: The QoS model should be able to monitor the actual QoS situation at the Data Link Layer (layer 2). This information is offered to the adaptive applications.

QoS fast resource reservation: Said QoS model should be able to reserve the QoS demand from applications by signaling this information to the components of the Data Link Layer (layer 2).

QoS adaptation: The QoS model should be able to immediately react to changing QoS demands from applications by signaling this information to the components of the Data Link Layer (layer 2). In this context, it should be able to support responsive restorations of "lost" connections.

QoS pre-allocation: The QoS model should be able to pre-allocate QoS demands from applications to potential new communication paths by signaling this information to the components of the Data Link Layer (layer 2) along a new path.

Besides, it should be able to provide a soft-state management as described above and a release of outstanding reservations.

In the following, a number of prerequisites shall briefly be mentioned which are necessary for the proposed solution according to the underlying invention:

Mobility protocol: A mobility protocol solution has to be available that supports a fast handover. As described in "Mobility Related Terminology" (Internet Draft, Internet Engineering Task Force, IETF, July 2001) by J.

Manner et al., a fast handover approach primarily aims to minimize delay, without an explicit interest in packet loss.

Handover trigger: Moving around in a field of access points, the MN has to find out when the time has come to change to the next access point in order to keep an optimal wireless connection. Therefore, there is the need for quality-monitoring units triggering the Data Link Layer (layer 2). Said link-layer triggers should be located in the MN due to the fact that only the MN is able to measure the actual link quality to the potential reachable access points. Thereby, the upper layers are informed by the trigger event to initialize a planned handover.

Besides, the QoS model should be supported by all involved nodes to give full end-to-end QoS support.

Furthermore, the IPv6 protocol as described in "Internet Protocol, Version 6 (IPv6) Specification" (IETF RFC 2460, December 1998) by S. Deering and R. Hinden has to be available.

Finally, the Data Link Layer (layer 2) must be able to process QoS requests generated by the QoS model.

BRIEF DESCRIPTION OF THE CLAIMS

The independent claim 1 and the dependent claims 2 to 9 refer to a QoS management unit of a mobile terminal connected to a wireless network which is designed to support real-time multimedia services running on said mobile terminal to dynamically adapt to a time-varying node connectivity and unsteady link characteristics of the underlying mobile radio channel. Thereby, said QoS management unit supports different access technologies and/or mobile services by giving said services the possibility to pre-allocate, reserve, monitor and adapt different QoS-related parameters.

Finally, the dependent claims 10 to 12 are directed to methods for operating a QoS management unit according to anyone of the preceding claims, characterized in that "handover indication" requests, "soft reservation" requests and/or "hard reservation" requests can be performed.

BRIEF DESCRIPTION OF THE DRAWINGS

Further advantages and possible applications of the underlying invention result from the subordinate claims as well as from the following description of one embodiment of the invention which is depicted in the following drawings:

FIG. 26 illustrates the "handover indication" signaling with a "soft reservation" to the potential access points AP2 and AP3 (step #1), FIG. 27 illustrates the collection of information about the available bandwidth on the new paths over AP2 and AP3 (step #2), FIG. 28 illustrates a scenario wherein the mobile node (MN) informs the correspondent node (CN) that a handover is upcoming (step #3), FIG. 29 illustrates the execution of a handover to an access point (AP2) and a "hard reservation" on the new path over AP2 (step #4), FIG. 30 illustrates the situation after the handover has finished and the unused reservations have been released by a time-out process (step #5), FIG. 31 shows an example of a handover scenario wherein the proposed QoS management unit is applied, FIG. 32 shows QoS-related records in the intermediate nodes, FIG. 33 depicts the QoS monitoring, reporting and adaptation process.

DETAILED DESCRIPTION OF THE UNDERLYING INVENTION

In the following, the preferred embodiment of the underlying invention as depicted in FIGS. 1 to 34 shall be explained in detail. The meaning of the symbols designated with reference signs in FIGS. 1 to 34 can be taken from Table 4.

Figure 3:
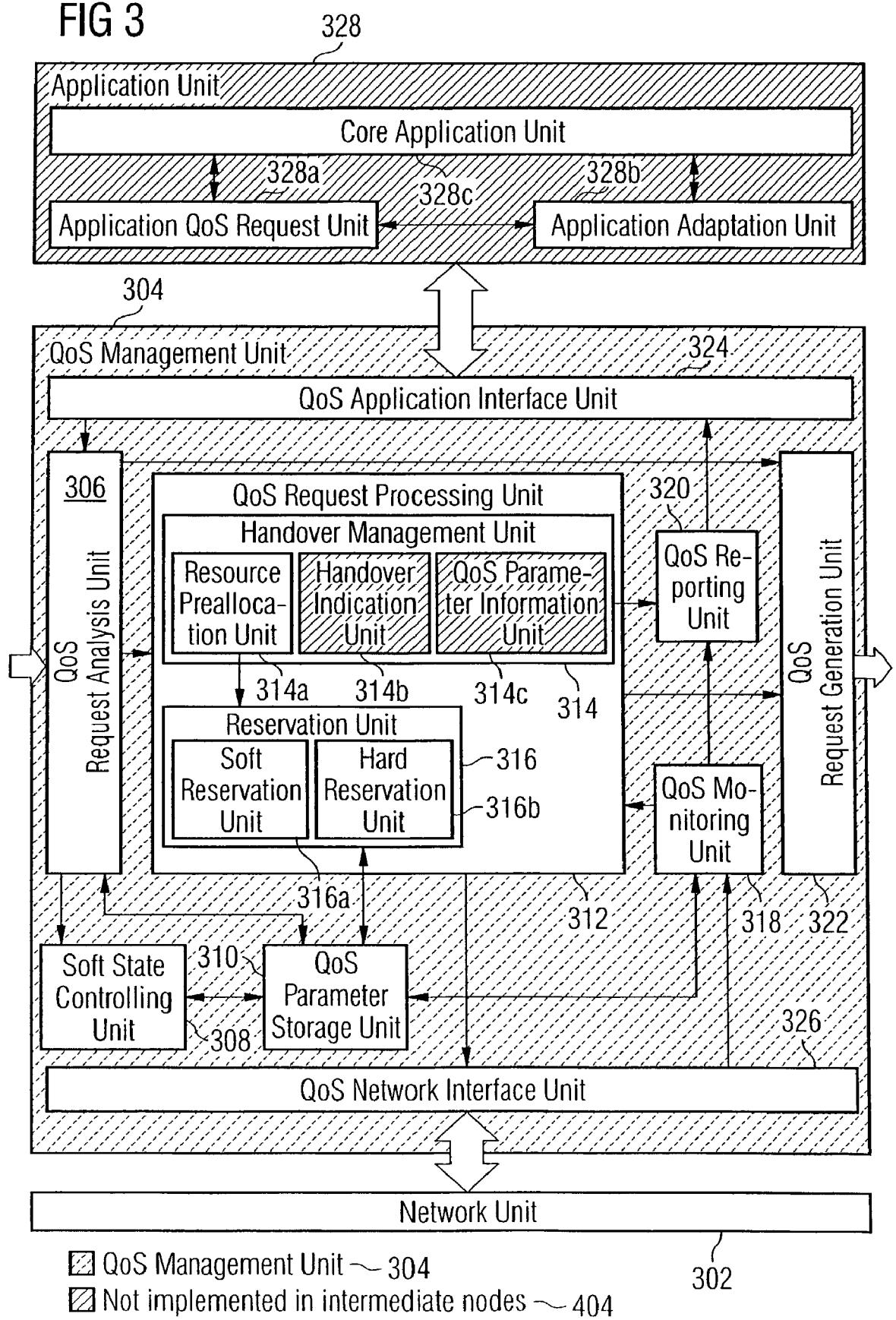
FIG. 3 shows the architecture of the QoS management unit.

The proposed QoS management unit 304 as depicted in FIG. 3 provides the functionality to represent a QoS model being able to fulfill the requirements of mobile users described above. As can be taken from Table 1, each sub-unit of said QoS management unit 304 may comprise hardware or software elements.

Figure 2:
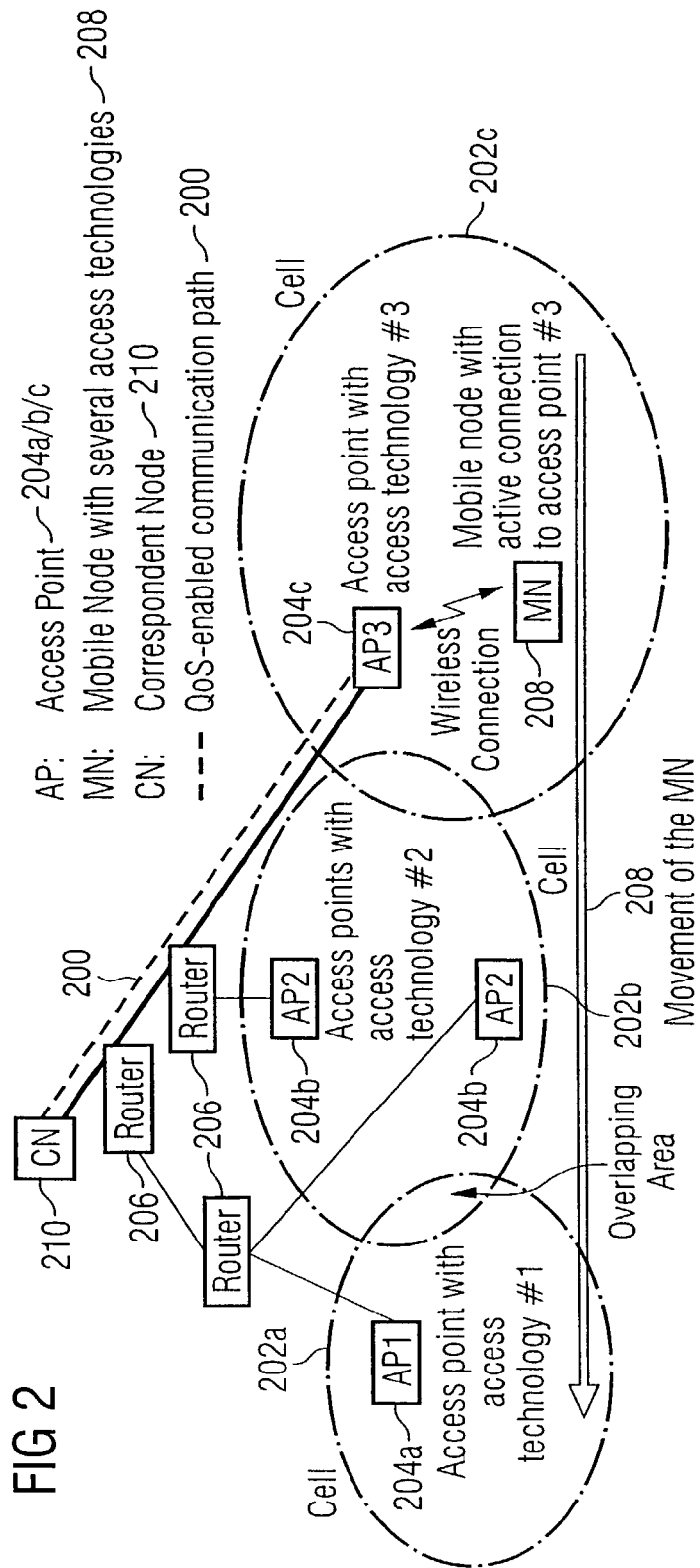
FIG. 2 depicts the scenario of a QoS-enabled communication path between a mobile node (MN) accessed by different technologies and a correspondent node (CN)

The proposed QoS management unit 304 has to be implemented on all nodes along a QoS-enabled communication path 200 between a MN 208 accessed by different technologies and a CN 210 as depicted in FIG. 2 in order to get the full support from the underlying QoS model.

Figure 4:
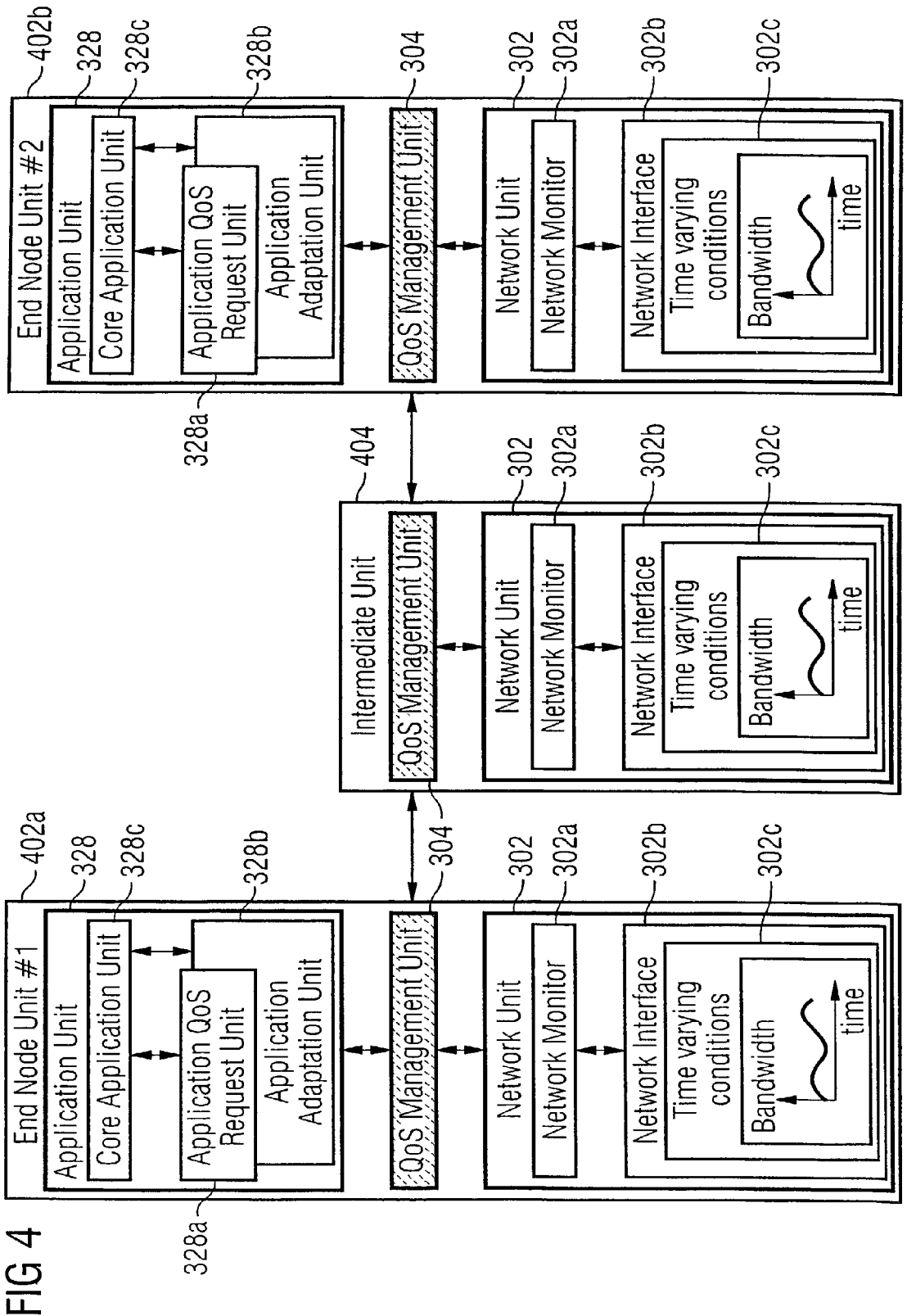
FIG. 4 shows the architecture of a QoS management unit within a communication scenario.

In the following, it shall be assumed that the intermediate nodes 404 do not comprise any integrated application unit 328. Due to this fact, the intermediate nodes 404 as depicted in FIG. 4 do not need the full functional scope of the QoS management unit 304. For example, the "handover indication" unit 314b and the QoS parameter information unit 314c are not needed within an intermediate node 404.

Said intermediate nodes 404 are responsible for QoS monitoring and controlling performed by their associated network units 302. Thereby, the following tasks have to be handled:

- resource reservation according to a request,
- changing the state of the internal "QoS table" 3200, and
- changing or adapting the information about certain fields in the QoS packets.

The end node units 402a+b are located on top of these functionality- and/or application-related units. They organize the demands from the running applications to the underlying network. In this context, said end node units 402a+b can advantageously be applied to evaluate network requests and response to them.

According to requests defined by applications the application unit 328 are able to

- initiate "setup" messages to set up a QoS-aware data flow path, "handover indication" messages 2400 to inform running applications about an upcoming handover event 2900 and to announce the QoS parameters that can be expected after the handover 2900 is finished, and "release" messages to release reserved resources on an unused QoS data flow path,
- periodically send QoS monitoring messages,
- receive QoS information from the network related module and forwards this information to respective applications in case the QoS situation changes, and
- send QoS requests according to the adaptation of an application.

Thereby, QoS data flows 1102a-c have to be rapidly established, restored, adapted and released in response to wireless impairments and topology changes. Whereas the complexity of existing protocols often does not fulfill these requirements, an in-band signaling approach that explicitly carries control information in the IP packet header is well suited to manage reservation flow state in mobile networks.

The QoS management unit 304 defines options within the IPv6 extension header described in "Internet Protocol, Version 6 (IPv6) Specification" (IETF RFC 2460, December 1998) by S. Deering and R. Hinden to setup, restore and adapt resources between two connection parties. When intermediate nodes 404 receive IPv6 packets with these options set they attempt to reserve, restore or adapt resources.

Figure 1:
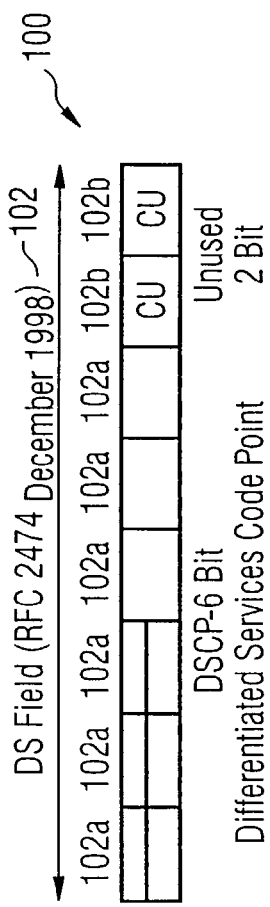
FIG. 1 illustrates the definition of two currently unused (CU) bits used in the differentiated services (DS) field.
Figure 5:
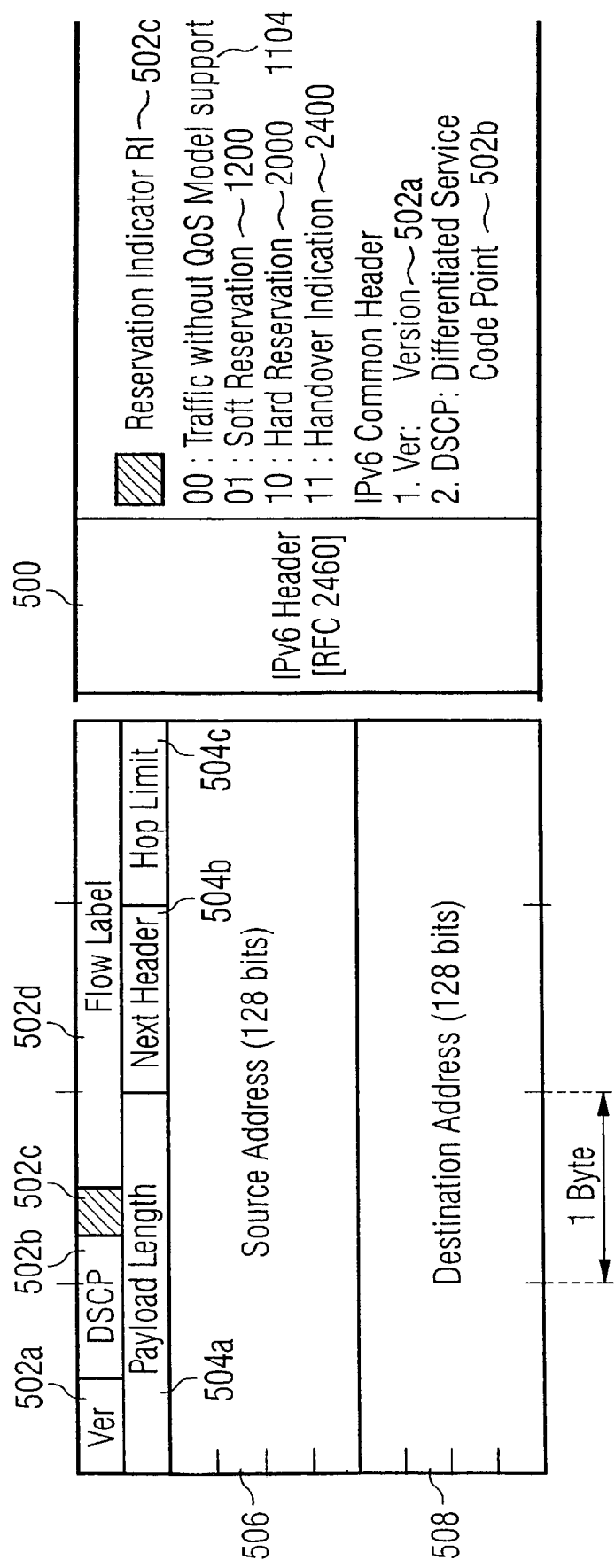
FIG. 5 shows an IPv6 header with the newly introduced reservation indication (RI) field.

As depicted in FIG. 1, IPv6 packets that support the QoS model are made possible by at least two currently unused (CU) bits as defined in "Definition of the Differentiated Services (DS) Field in the IPv4 and IPv6 Headers" (IETF RFC 2474, December 1998) by K. Nichols, S. Blake, F. Baker and D. Black. FIG. 5 shows the IPv6 header 500 with a "reservation indication" (RI) field 502c.

Using these two "reservation indicator" (RI) bits as an indication for specific QoS treatment effects the overall, performance of the system in a positive way. Thereby, no additional overhead is associated in using this bit pattern 502c. Furthermore, monitoring said RI bits in intermediate nodes 404 can be implemented in an efficient way.

Figure 6:
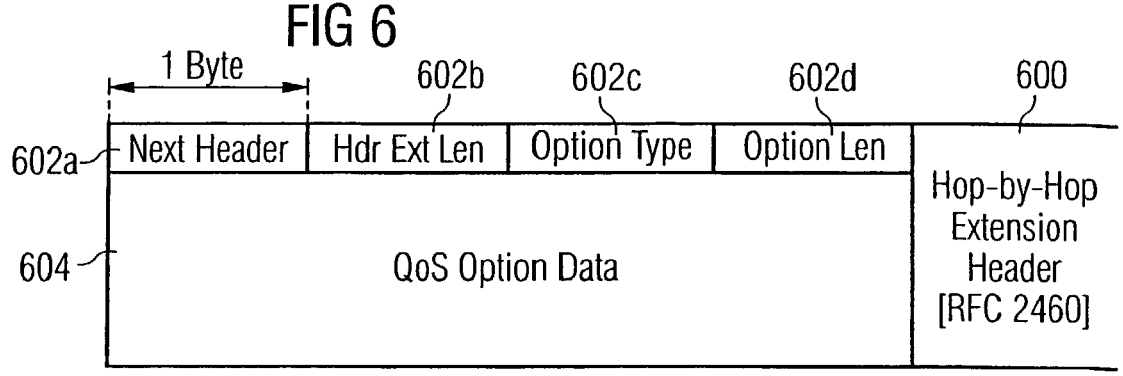
FIG. 6 depicts a hop-by-hop extension header.

The proposed solution of the underlying invention supports real-time services (e.g. VoIP) that are sensitive to bandwidth degradation, delay and jitter variations by using network algorithms which are adaptive and responsive to the time-varying resource availability of the wireless link. For this purpose, an adaptive and responsive functionality is combined within the communication stream. Thereby, the time-varying resource availability information about the end-to-end QoS path 200 is injected into the ongoing session data. Therefore, the offered functionality of the IPv6 protocol is applied. The content for an extension header that is able to transport QoS-related information in a flexible way is defined in the scope of the proposed solution. Said solution has been designed in respect of conforming considerations to the IPv6 framework. In IPv6, optional Internet-layer information is encoded in separate extension headers that may be placed between the IPv6 header 500 and the layer header of a packet. In this context, FIG. 6 shows a so-called hop-by-hop extension header 600 as described in "Internet Protocol, Version 6 (IPv6) Specification" (IETF RFC 2460, December 1998) by S. Deering and R. Hinden, which is used as a container for the QoS-related information.

The fields of the hop-by-hop extension header 600 mentioned above comprise one next header field 602a, one header extension length field 602b, one option type field 602c, one option length field 602d and one QoS option data field 604, which are defined as follows:

- The next header field 602a is an 8-bit selector that identifies the type of header immediately following the hop-by-hop options header.
- The header extension length field 602b is an 8-bit unsigned integer that reflects the length of the hop-by-hop options header (in 8-octet units, not including the first eight octets).
- The option type field 602c is an 8-bit identifier of the respective option type. The two highest-order bits of said option type field 602c must be zero.
- The option length field 602d is an 8-bit unsigned integer that reflects the length of the option data 604 field of said option (in octets).
- The QoS option data field 604 is a field whose length is variable. It contains option type specific data.

In the following, a new QoS option shall be described that comprises the option type field 602c, the option length field 602d and one or more QoS object 700 representing said QoS option data 604.

Each QoS object 700 consists of at least one 32-bit word with a one-word header. Thereby, said QoS object 700 is able to transport all kind of information to manage the QoS capabilities of a mobile network. In this context, it should be mentioned that there is no restriction to transport only QoS capabilities.

Figure 7:
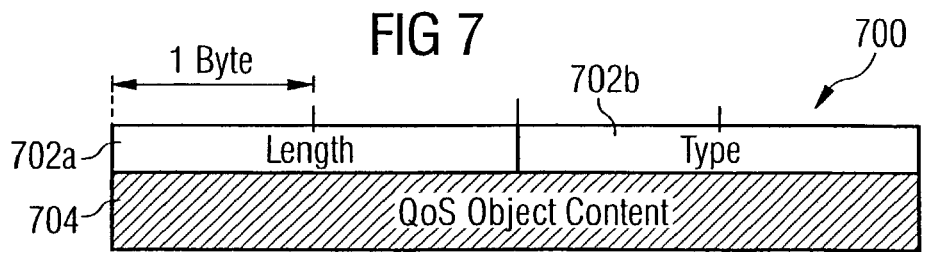
FIG. 7 shows the format of a QoS object starting with the fields "length" and "type", FIG. 8 exhibits the bandwidth request (BRQ) object defining the traffic characteristics of a sender's QoS data flow.

As can be taken from FIG. 7, each QoS object 700 starts with two fields: one length field 702a and one type field 702b.

The length field 702a is a 16-bit field that contains the total object content length in bytes. It must always be a multiple of 4, and at least 4.

The type field 702b identifies a unique type for each object. The two high-order bits of said type field 702b are used to determine what action a node should take if it does not recognize the type of an object.

In the following, two QoS objects 700 that are actually defined shall briefly be described: the bandwidth request (BRQ) object 800 and the flow ID object 900.

The bandwidth request (BRQ) object 800 defines the traffic characteristics of a sender's QoS data flow 1102a/b/c. It allows a source to specify its maximum (MaxBW) bandwidth requirements 802a and/or minimum (MinBW) bandwidth requirements 802b for adaptive real-time service support. In case of reservation of resources with the SetBW field 802a it is possible to define the amount of bandwidth that should be reserved along the communication path 200. The actual bandwidth field 804b (AcBW) collects the actual QoS information along the communication path 200. With this feedback information about the actual system status it is possible to initiate adaptive and responsive actions.

Figure 8:
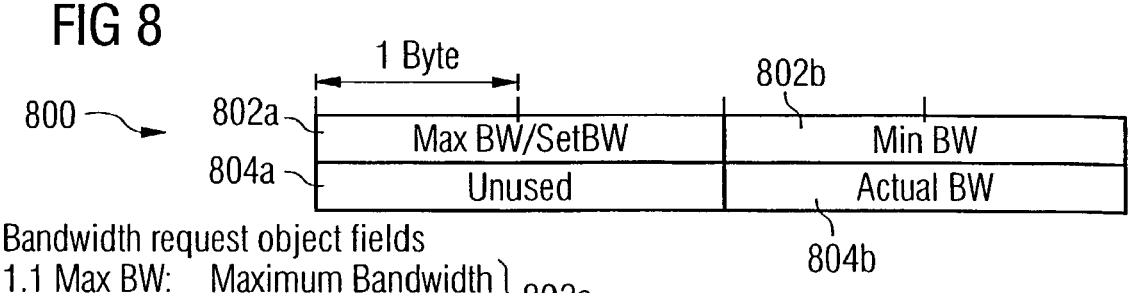

As depicted in FIG. 8, the bandwidth request (BRQ) object 800 has the following format:

MaxBW/SetBW: The 16-bit maximum bandwidth field 802a (MaxBW) indicates the maximum bandwidth request (BRQ) for a specific QoS data flow 1102a/b/c in case of "soft reservation" 1200. By contrast, the 16-Bit set bandwidth (SetBW) field, here also designated with 802a, indicates the bandwidth that has to be reserved for a specific QoS data flow 1102a/b/c in case of "hard reservation" 2000.

MinBW: The 16-bit minimum bandwidth (MinBW) field 802b indicates the minimum bandwidth request (BRQ) for a specific QoS data flow 1102a/b/c.

AcBW: The 16-bit actually reserved bandwidth (AcBW) field 804b is used to report the actual minimum reserved bandwidth through all the hops on the path 200 (the maximum available end-to-end bandwidth).

Unused: This term denotes the currently unused 16-bit field 804a.

In the following, the term "flow ID 900" shall be used to identify a unique QoS data flow 1102a/b/c. The flow ID 900 consists of the IPv6 sender's source address (the address of the QoS data flow 1102a/b/c generating host) and the IPv6 flow label 502d as defined in "Internet Protocol, Version 6 (IPv6) Specification" (IETF RFC 2460, December 1998) by S. Deering and R. Hinden. The flow ID object 900 carries this IPv6 source address and the IPv6 flow label 502d identifying a unique QoS data flow 1102a/b/c.

When the receiver of a QoS data flow 1102a/b/c changes its role and starts replying to a session defined by a specific flow ID 900, the receiver is going to move its IPv6 address into the source address field 506 of the IPv6 packet header. In this case, the combination of source address 506 and flow label 502d does no longer represent the origin flow ID 900, and thus intervening nodes 404 are no longer able to correctly classify packets belonging to said QoS data flow 1102a/b/c. Therefore, when QoS data flow 1102a/b/c transparency is required, a flow ID object 900 is required to transport the origin flow ID 900 information. For example, it is used in pre-allocation situations where a new reservation path with a specific flow ID 900 (defined by the sender) has to be set up by the receiver.

Figure 9:
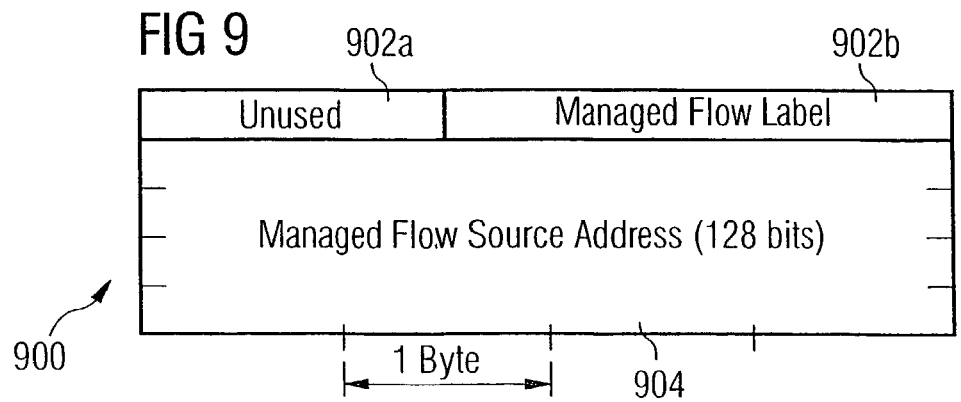
FIG. 9 shows the format of a flow ID object which is used to identify a unique QoS data flow.
Figure 10:
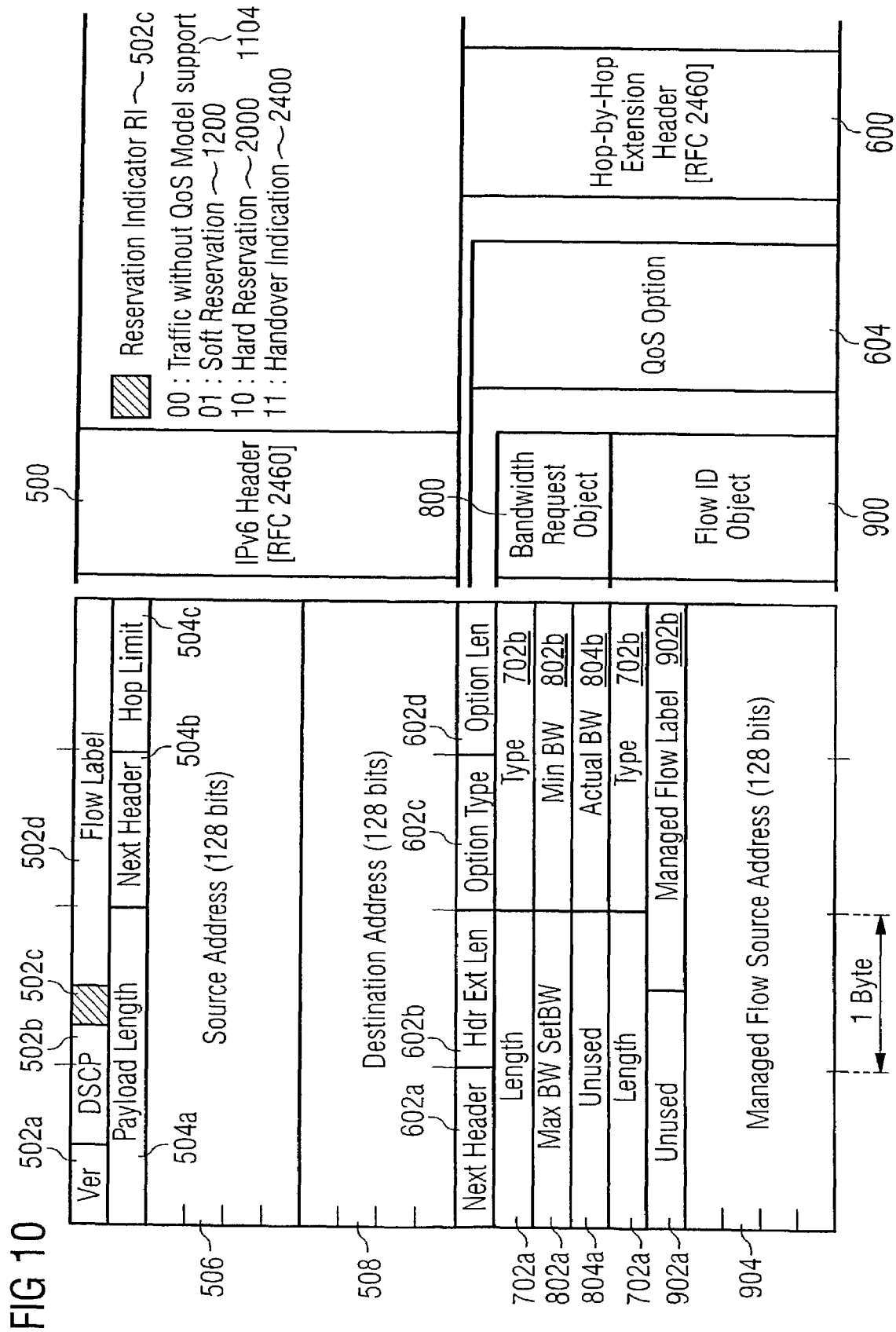
FIG. 10 shows an example of an IPv6 header with a bandwidth request (BRQ) object and a flow ID object embedded within a hop-by-hop extension header.

The flow ID object 900 as depicted in FIG. 9 has the following format:

Unused: This term denotes the currently unused 12-bit field 902a.

The managed QoS data flow 1102a/b/c source address field 904 is the 128-bit IPv6 source address of the QoS data flow 1102a/b/c-generating host. It must be non-zero.

The managed flow label field 902b is a 20-bit flow label that is defined in IPv6. This value may be used by the packet classifier to efficiently identify the packets belonging to a particular QoS data flow 1102a/b/c transmitted from a specific sender to a specific receiver.

In the following, an effective way of resource management with a soft and "hard reservation" mode according to the proposed solution of the underlying invention shall briefly be described.

In general, QoS-enabled entities have the following functionality to treat QoS-enabled traffic:

In case of operation without any QoS-specific improvements, the total available bandwidth 1106 within a router 206 is shared by QoS-enhanced QoS data flows 1102a/b/c along with non-QoS traffic 1104.

Figure 11:
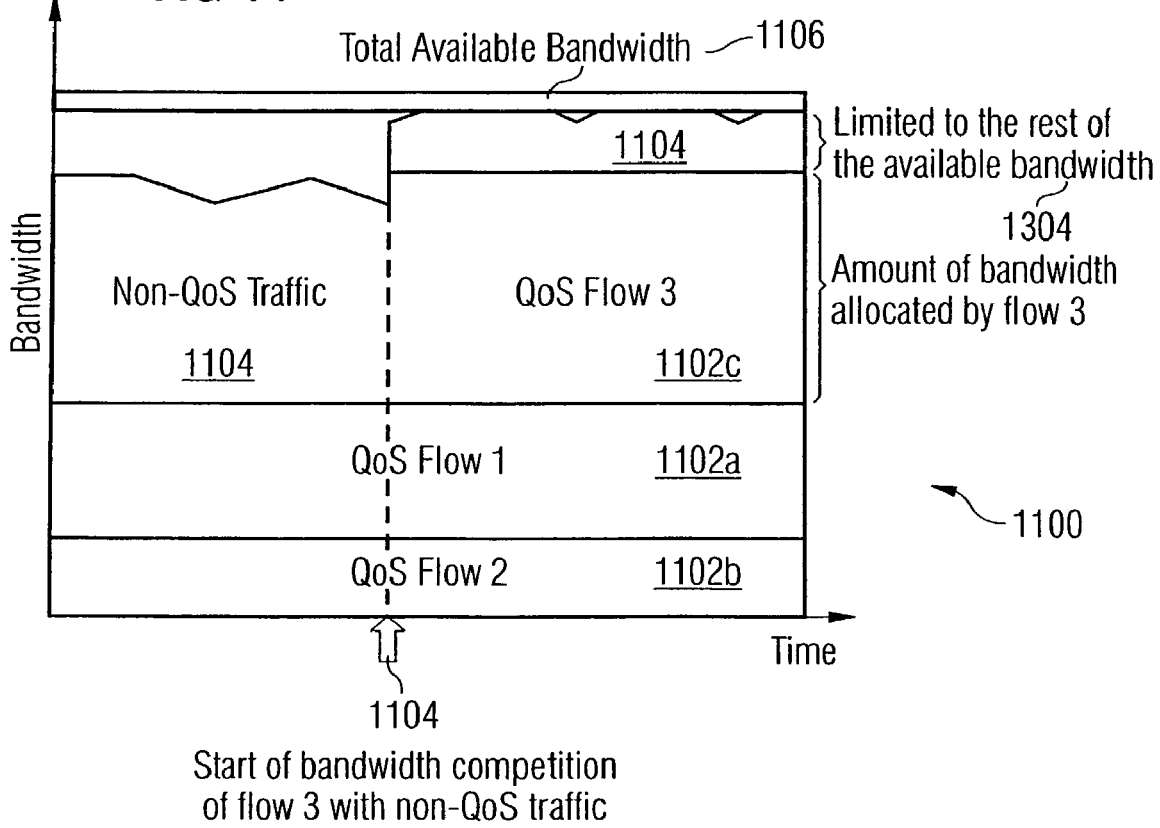
FIG. 11 shows an example of a bandwidth competition between QoS-enabled and non-QoS traffic.

In case of bandwidth competition, QoS-supported traffic 1102a-c should be treated with a higher priority than non-QoS-supported traffic 1104. A QoS-enabled QoS data flow 1102a-c has a specific demand for bandwidth, while this is not defined for a non-QoS traffic 1104. In FIG. 11, an example is shown that illustrates bandwidth competition of QoS-enabled traffic 1102a-c and non-QoS traffic 1104.

To overcome the problem of wasting resources mentioned above and to achieve a better network utilization, the concepts of "soft reservation" 1200 and "hard reservation" 2000 shall be defined.

Thereby, a "soft reservation" message 1200 is used to set up a reservation for new QoS data flow 1102a/b/c, which means that a QoS data flow 1102a/b/c is able to declare its potential future demand for QoS capabilities (e.g. a certain amount of bandwidth), and periodically monitor the QoS situation throughout the communication path 200.

A reservation which has been defined as soft state 1200 has to be refreshed. Then, said "soft" reserved capabilities 1302a can be used by any other QoS data flow 1102a/b/c until the state of the reservation is changed to "hard reservation" 2000.

Figure 12:
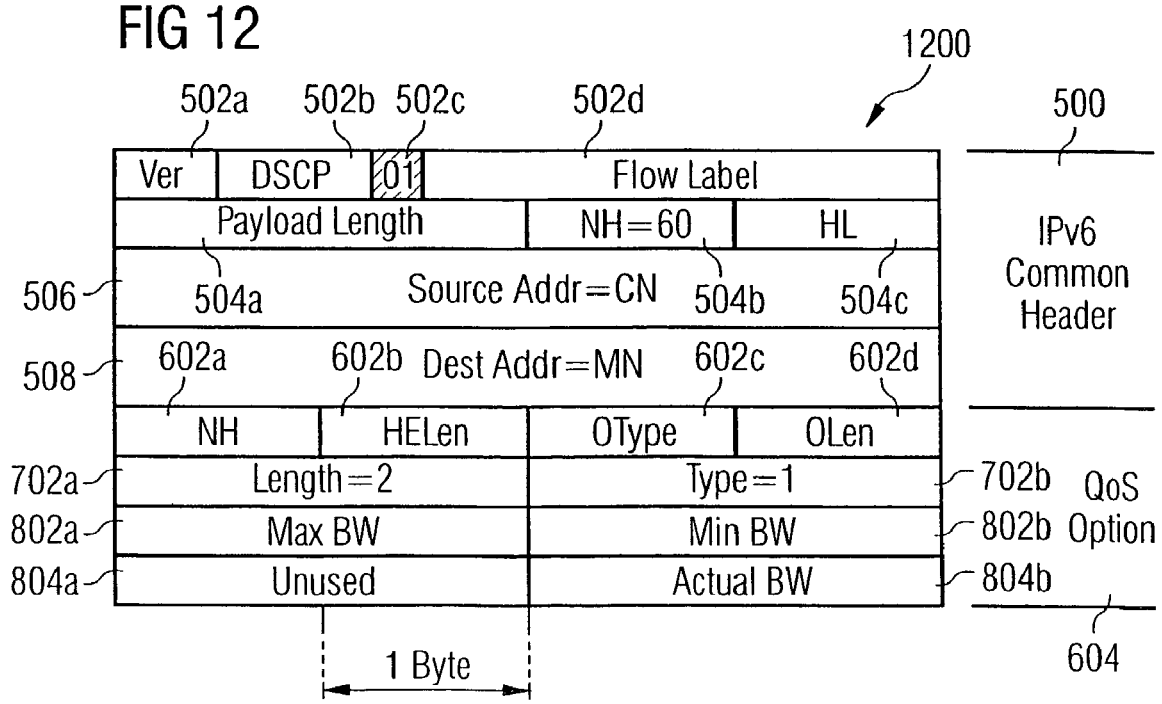
FIG. 12 shows the format of the "soft reservation" request, FIG. 13 describes the operations of the QoS request processing unit when a "soft reservation" request is reaching intermediate nodes.

As shown in FIG. 12, the "soft reservation" request 1200 has the following format:

The RI field 502c is set to "01" to indicate a "soft reservation" 1200.

The bandwidth request (BRQ) object 800 consists of one maximum bandwidth (MaxBW) request 802a for a specific QoS data flow 1102a/b/c, one minimum bandwidth (MinBW) request 802b for said QoS data flow 1102a/b/c, and the actual bandwidth 804b (AcBW) is used to report the actual minimum reserved bandwidth 802b for all the hops on the reserved path (the maximum available end-to-end bandwidth 1106).

Figure 13:
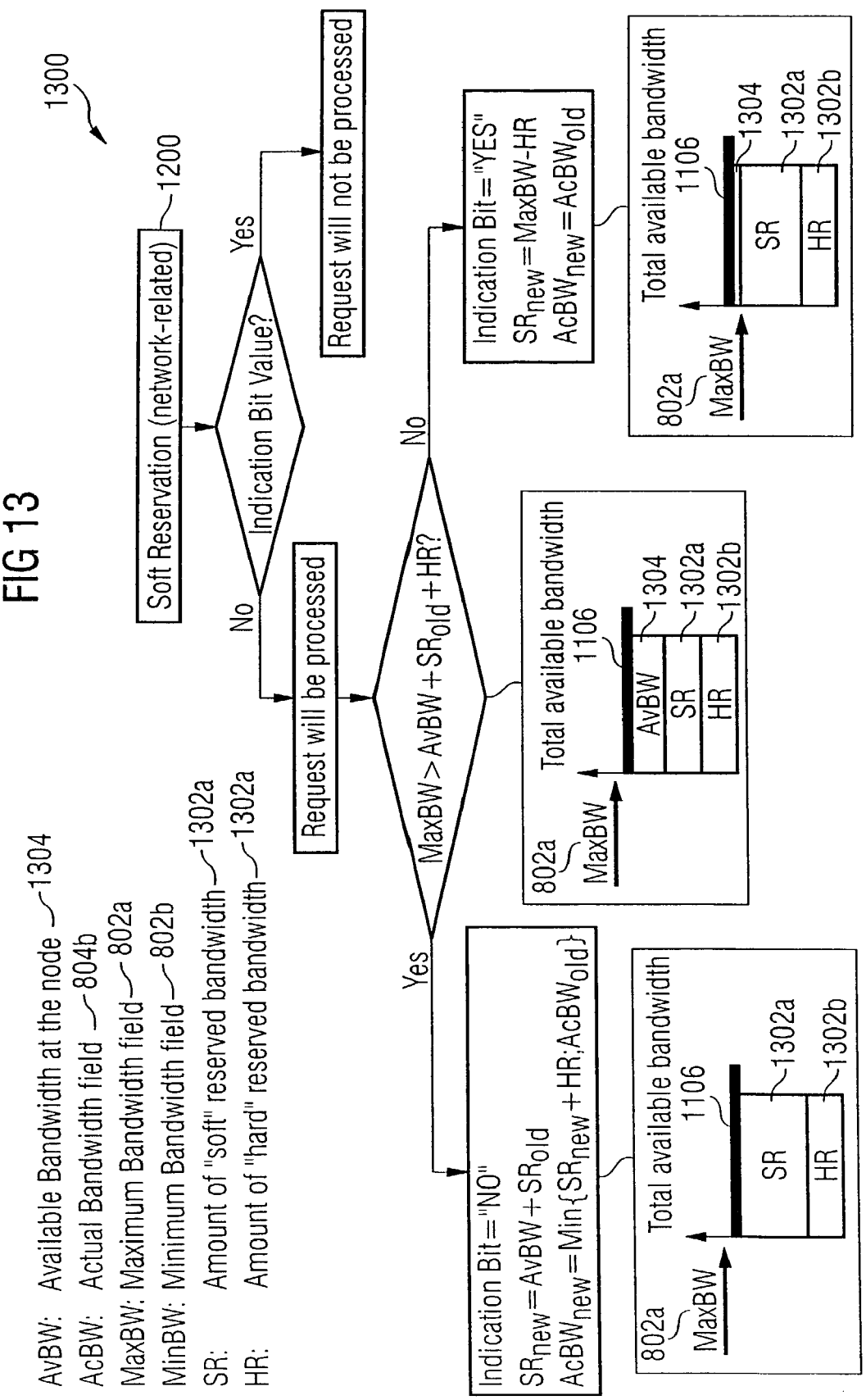

In the following sections, the operations 1300 of the QoS request processing unit 302 shall briefly be described for the case when a "soft reservation" request 1200 is reaching an intermediate node 404 as shown in the flowchart depicted in FIG. 13. Thereby, the intermediate node 404 checks the record of the indicator field 3201.

Figure 14:
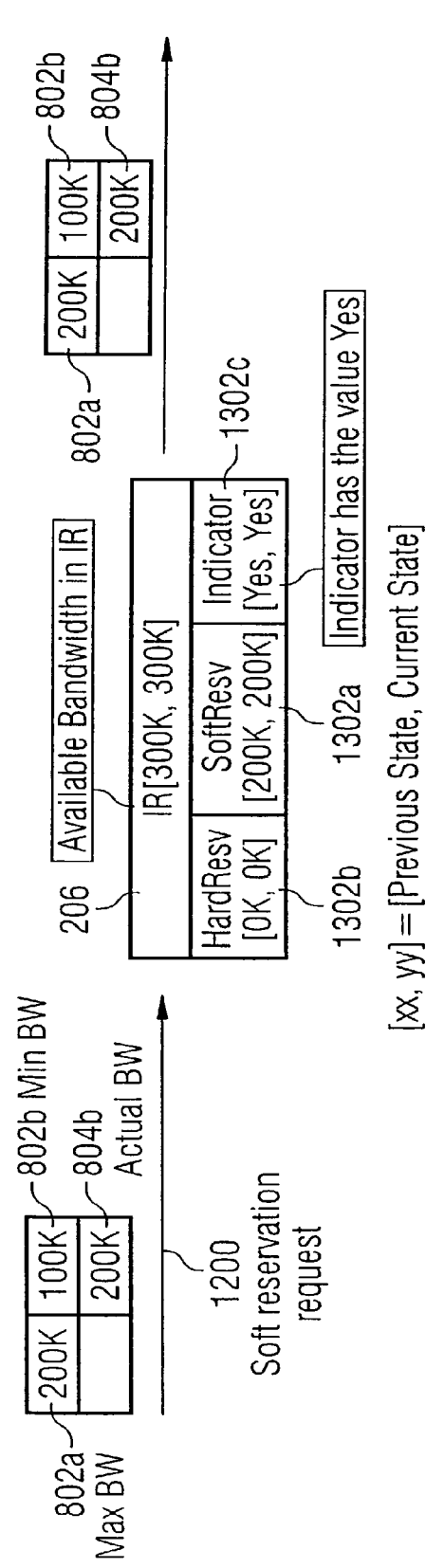
FIG. 14 shows an example for a bandwidth request (BRQ) processing on an intermediate node, in which the indicator entry is "Yes"

In case the indicator entry of the indicator field 3201 has the value "Yes", the "soft reservation" request 1200 will not be processed and passed by to the next hop. In this context, "Yes" denotes the maximum bandwidth 802a which has been already been reserved in this node. If the request is passed by, the processing load within the intermediate routers 206 will be reduced. An example for a bandwidth request (BRQ) processing 1400 on an intermediate node 404, in which the entry of the indicator field 3201 is "Yes" is shown in FIG. 14.

In case the entry of the indicator field 3201 has the value "No", the "soft reservation" request 1200 will be analyzed. In this context, "No" means that the maximum bandwidth 802a has not yet been reserved in this node or the value was changed to "No" to force an analysis of the actual situation at the node. If the maximum bandwidth (MaxBW) demand 802a is higher than the sum of the available bandwidth 1304 (AvBW) plus the "soft" reserved bandwidth 1302a ($SR_{old}$) and "hard" reserved bandwidth 1302b (HR) at the respective node 404, the following actions will be performed:

The indication bit of the indicator field 3201 will be set to "No".

The new value 1302a of the "soft reservation" 1200 ($SR_{new}$) will be the sum of the actually available bandwidth 1304 ($AvBW_{old}$) at the intermediate node 404 and the amount of the actual "soft" reserved bandwidth 1302a ($SR_{old}$), as can be taken from the following equation:

$SR_{new}:=AvBW_{old}+SR_{old}$ (with $AcBW_{old} \equiv AcBW$ and $SR_{old} \equiv SR$).

After that, the amount of the sum of the new values 1302a and 1302b for the "soft reservation" 1200 ($SR_{new}$) and "hard reservation" 2000 (HR), respectively, will be compared to the amount of the actual bandwidth field 804b ($AcBW_{old}$). The minor amount will be stored into the actual bandwidth field 804b ($AcBW_{new}$) according to the following equation:

$AcBW_{new}:=Min\{SR_{new}+HR; AcBW_{old}\}$.

This will indicate the reserved bandwidth to the following entities on the end-to-end path.

In case the entry of the indicator field 3201 has the value "No", and the demand for said maximum bandwidth (MaxBW) 802a is lower or equal than the sum of the available bandwidth 1304 (AvBW) at the intermediate node 404 plus the "soft" reserved bandwidth 1302a ($SR_{old}$) and "hard" reserved bandwidth 1302b (HR), the following actions will be performed:

The indication bit of the indicator field 3201 will be set to "Yes".

The value of the "soft" reserved bandwidth 1302a ($SR_{new}$) will be the demand for the maximum bandwidth 802a (MaxBW) minus the amount of the already "hard" reserved bandwidth 1302b (HR), as can be taken from the following equation:

$SR_{new}:=MaxBW-HR$.

The new value for the actual bandwidth field 804b ($AcBW_{new}$) will not be changed, as can be taken from the following equation:

$AcBW_{new}:=AcBW_{old}$ (with $AcBW_{old} \equiv AcBW$).

Figure 15:
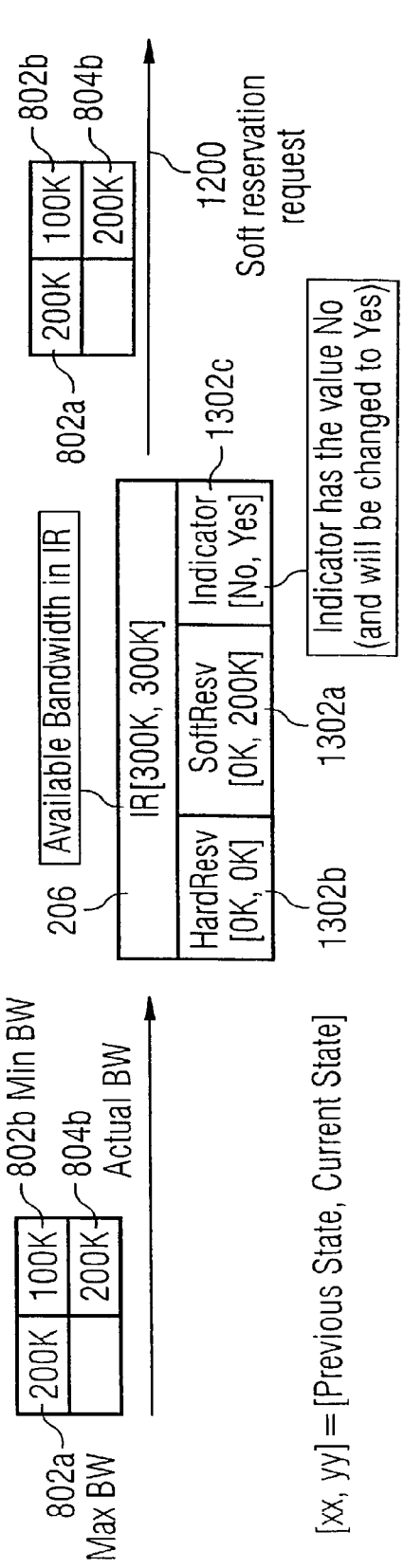
FIG. 15 shows an example for a bandwidth request (BRQ) processing on an intermediate node, in which the indicator entry is "No", FIG. 16 describes the operation of the QoS request processing unit when a "soft reservation" request is reaching the end node, FIG. 17 describes the operation of the QoS request processing unit when a "handover indication" request is reaching intermediate nodes, FIG. 18 describes the operation of the QoS request processing unit when a "handover indication" request is reaching the end node.

An example for a bandwidth request (BRQ) processing 1500 on an intermediate node 404, in which the entry of the indicator field 3201 is "No" is shown in FIG. 15.

Figure 16:
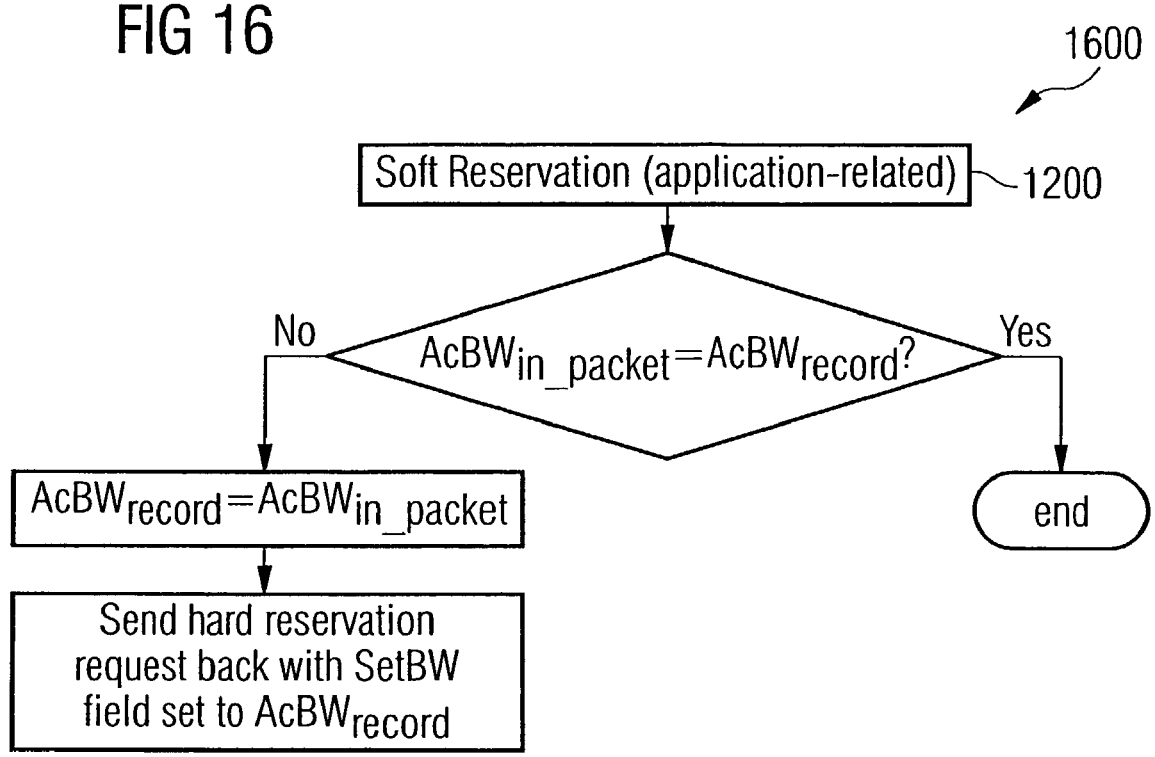

In the following sections, the operation 1600 of the QoS request processing unit 302 shall be described for the case when a "soft reservation" request 1200 is reaching an end node 402a/b as shown in the flowchart depicted in FIG. 16. An end node 402a/b can have additional functionality compared with intermediate nodes 404. Furthermore, an end node 402a/b comprises entities that define the QoS needs of applications.

Thereby, an end node 402a/b checks if the value for the actual bandwidth field 804b (AcBW) is equal to the record ($AcBW_{record}$) inside the configuration table of said end node 402a/b. In case $AcBW_{record}$ is equal to the AcBW field 804b, no action has to be processed. Otherwise, the $AcBW_{record}$ at the end node 402a/b will be updated with the value of the actual bandwidth field ($AcBW_{in\_packet}$) according to the equation $AcBW_{record}:=AcBW_{in\_packet}$, and a "hard reservation" request 2000 will be sent back. In this case, the bandwidth 1302b that should be "hard" reserved has to be equal to the value of the AcBW field 804b.

Figure 19:
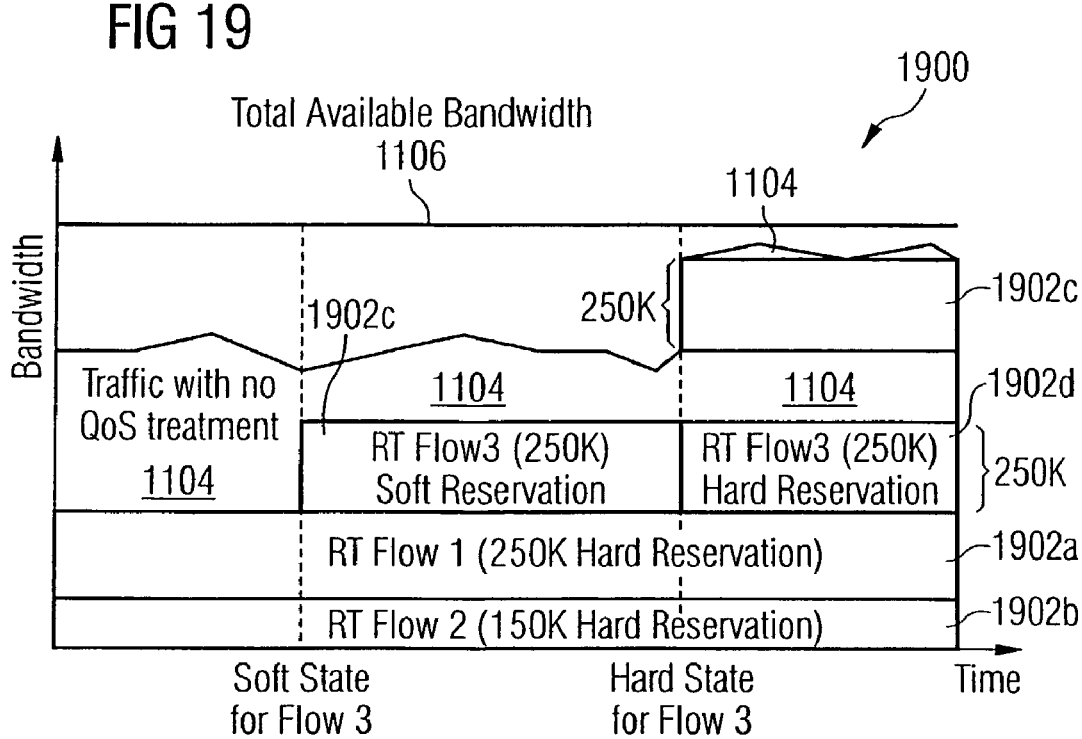
FIG. 19 shows an example of a state change from "soft reservation" to "hard reservation" for a real-time QoS data flow.

In case the "soft reservation" state 1200 is changed to a "hard reservation" state 2000 as depicted in FIG. 19, the QoS data flows 1102a/b/c that are currently using the allocated bandwidth 804b (AcBW) are discarded immediately, and the QoS data flow 1102a/b/c that is associated to the "hard reservation" 2000 will immediately have access to the resources 1302a defined in the soft state 1200.

"Hard reservation" 2000 is exclusively assigned to a specific QoS data flow 1102a/b/c with well-defined QoS capabilities for a data packet exchange. Thereby, no other QoS data flow 1102a/b/c can use this bandwidth except the one for which the "hard reservation" 2000 was intended. When a reservation is defined as soft state 1200, it has to be refreshed.

Figure 20:
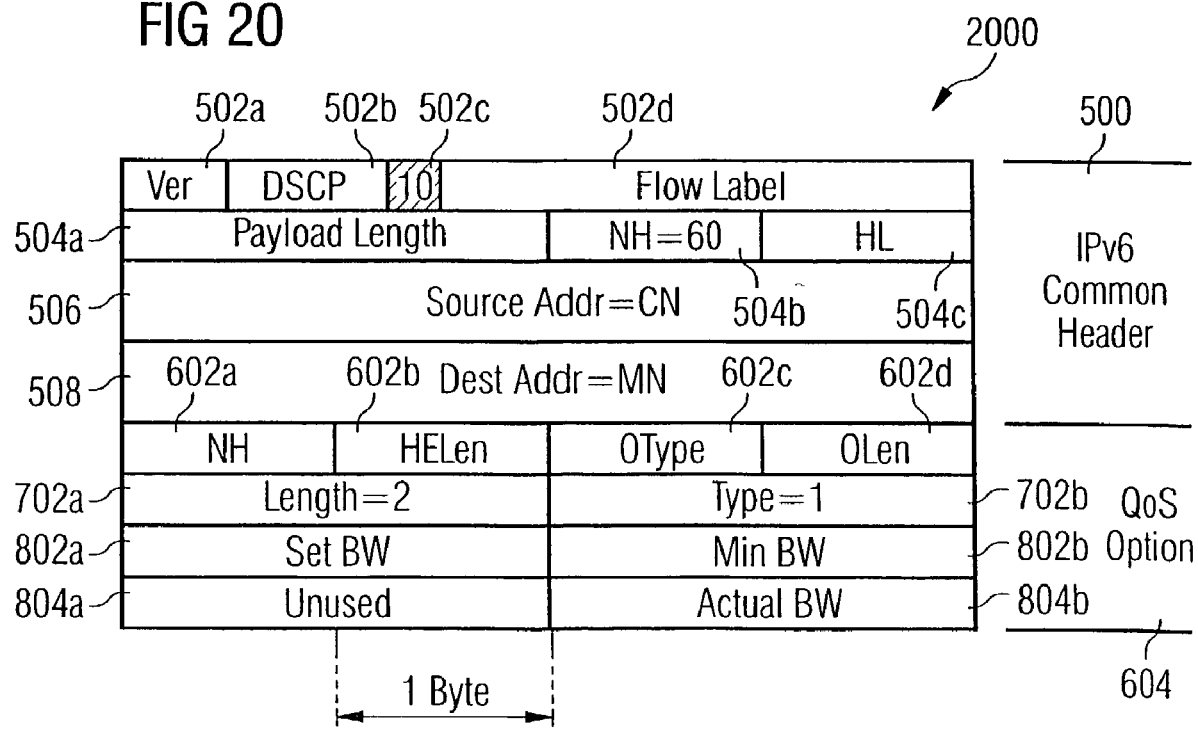
FIG. 20 shows the format of the "hard reservation" request, FIG. 21 describes the operation of the QoS request processing unit for the case when a "hard reservation" request is reaching intermediate nodes, FIG. 22 describes the operation of the QoS request processing unit for the case when a "hard reservation" request is reaching the end node.

As shown in FIG. 20, the "hard reservation" request 2000 has the following format:

The indication bits of the RI field 502c are set to "10" to indicate "hard reservation" 2000.

The bandwidth request (BRQ) object 800 consists of one maximum bandwidth (MaxBW) request 802a for a specific QoS data flow 1102a/b/c, one minimum bandwidth (MinBW) request 802b for said QoS data flow 1102a/b/c, and the set bandwidth (SetBW) request 802a indicates the amount of bandwidth that should be reserved for all the hops on the reserved path (the maximum available end-to-end bandwidth 1106). It should be noted that the meaning of the MaxBW 802a defined in the bandwidth request (BRQ) object 800 has been changed to SetBW, here also designated with 802a.

Figure 21:
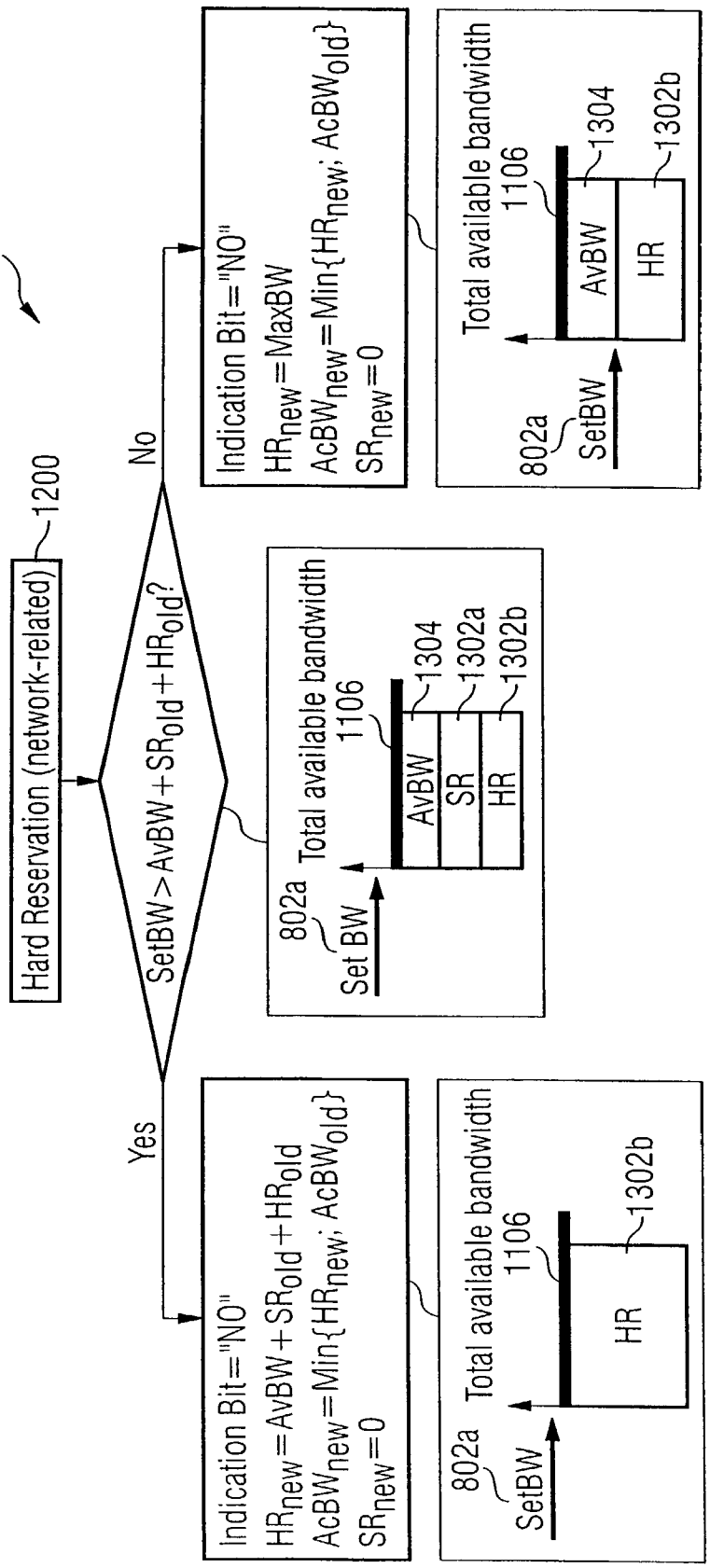

In the following sections, the operation 2100 of the QoS request processing unit 302 shall be described for the case when a "hard reservation" request 2000 is reaching an intermediate node 404, which is illustrated in the flowchart depicted in FIG. 21.

In case the value of the set bandwidth (SetBW) field 802a of a "hard reservation" request 2000 is higher than the sum of the available bandwidth 1304 (AvBW) plus the "soft" reserved bandwidth 1302a ($SR_{old}$) and "hard" reserved bandwidth 1302b ($HR_{old}$) at the intermediate node 404, the following actions will be performed:

The indication bit of the indicator field 3201 will be set to "No".

The new value 1302b of the "hard reservation" 2000 ($HR_{new}$) will be the sum of the actually available bandwidth 1304 (AvBW) and the amount of the actually "soft" reserved bandwidth 1302a ($SR_{old}$) and "hard" reserved bandwidth 1302b ($HR_{old}$) at the intermediate node 404, as can be taken from the following equation:

$$HR_{new} := AvBW + SR_{old} + HR_{old}$$

(with $SR_{old} = SR$ and $HR_{old} = HR$).

The amount of the new value for the actual bandwidth field 804b (AcBW) will be compared to the amount of the new value 1302b for the "hard reservation" 2000. The minor amount will be stored into the actual bandwidth field 804b (AcBW), as can be taken from the following equation:

$$AcBW_{new} := Min\{HR_{new}; AcBW_{old}\}$$

(with $AcBW_{old} = AcBW$).

The "soft reservation" record 1302a ($SR_{new}$) will be set to zero:

$$SR_{new} := 0.$$

In case the value of the set bandwidth (SetBW) field 802a of a "hard reservation" request 2000 is lower or equal than the sum of the available bandwidth 1304 (AvBW) at the intermediate node 404 plus the "soft" reserved bandwidth 1302a ($SR_{old}$) and "hard" reserved bandwidth 1302b ($HR_{old}$), the following actions will be performed:

The indication bit of the indicator field 3201 will be set to "No".

The value 1302b of the "hard reservation" 2000 ($HR_{new}$) will be the demand for the maximum bandwidth 802a (MaxBW), as can be taken from the following equation:

$$HR_{new} := MaxBW.$$

The new value for the actual bandwidth field 804b ($ACBW_{new}$) will be the new value 1302b for the "hard reservation" 2000 ($HR_{new}$) in case this value is smaller than the old entry for the actual bandwidth field 804b ($AcBW_{old}$). If this is not the case, the new value for the actual bandwidth field 804b ($AcBW_{new}$) will be equal to the old entry for the actual bandwidth field 804b ($AcBW_{new}$), as can be taken from the following equation:

$$AcBW_{new} := Min\{HR_{new}; AcBW_{old}\}.$$

The "soft reservation" record 1302a ($SR_{new}$) will be set to zero:

$$SR_{new} := 0.$$

Figure 22:
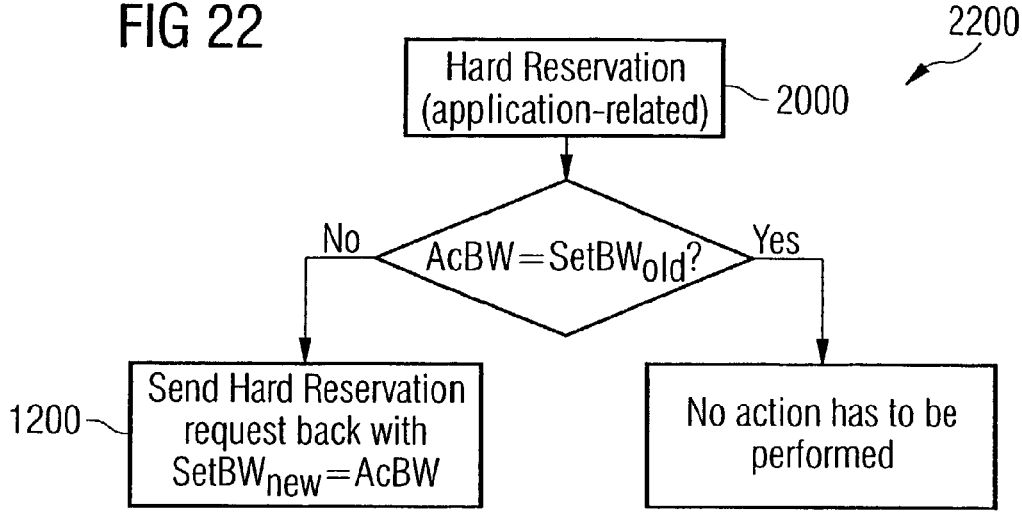

In the following sections, the operation 2200 of the QoS request processing unit 302 shall be described for the case when a "hard reservation" request 2000 is reaching the end node 402a/b, which is illustrated in the flowchart depicted in FIG. 22.

Thereby, the end node 402a/b checks if the value for the actual bandwidth field 804b (ACBW) is equal to the entry in the set bandwidth field 802a (SetBW). In case the value is equal to the actual bandwidth field 804b (AcBW), no action has to be processed. Otherwise, a "hard reservation" request 2000 will be returned. The bandwidth 1302b that should be "hard" reserved has to be equal to the value of the actual bandwidth field 804b (AcBW).

Figure 23:
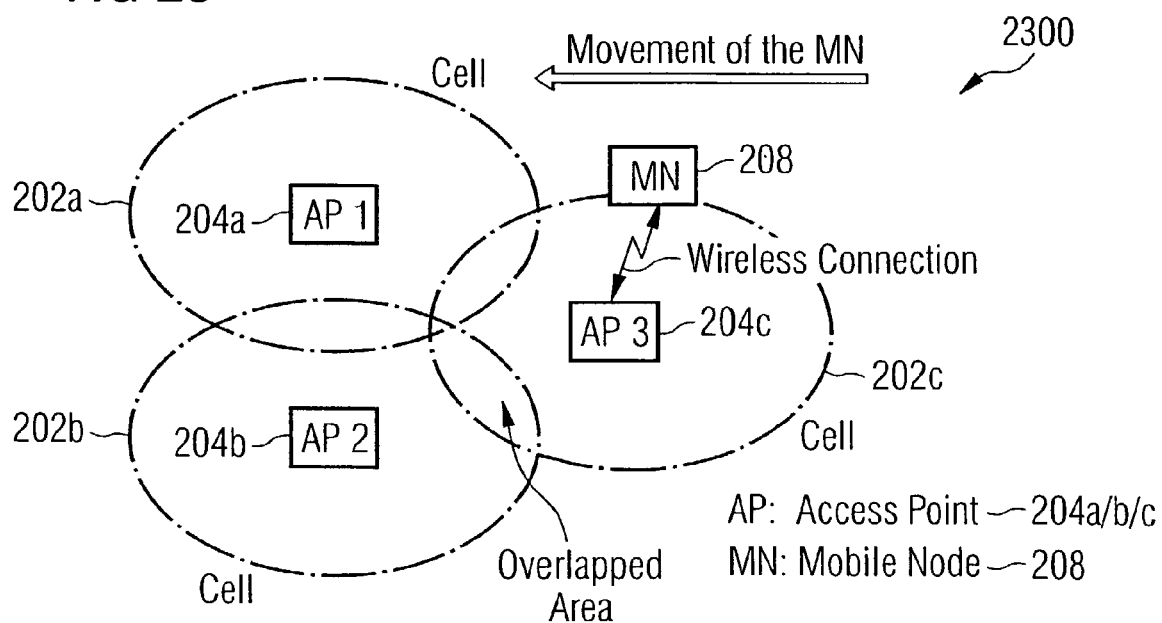
FIG. 23 shows an example of a mobile node (MN) changing its cell and access point (AP) of a cellular system.
Figure 24:
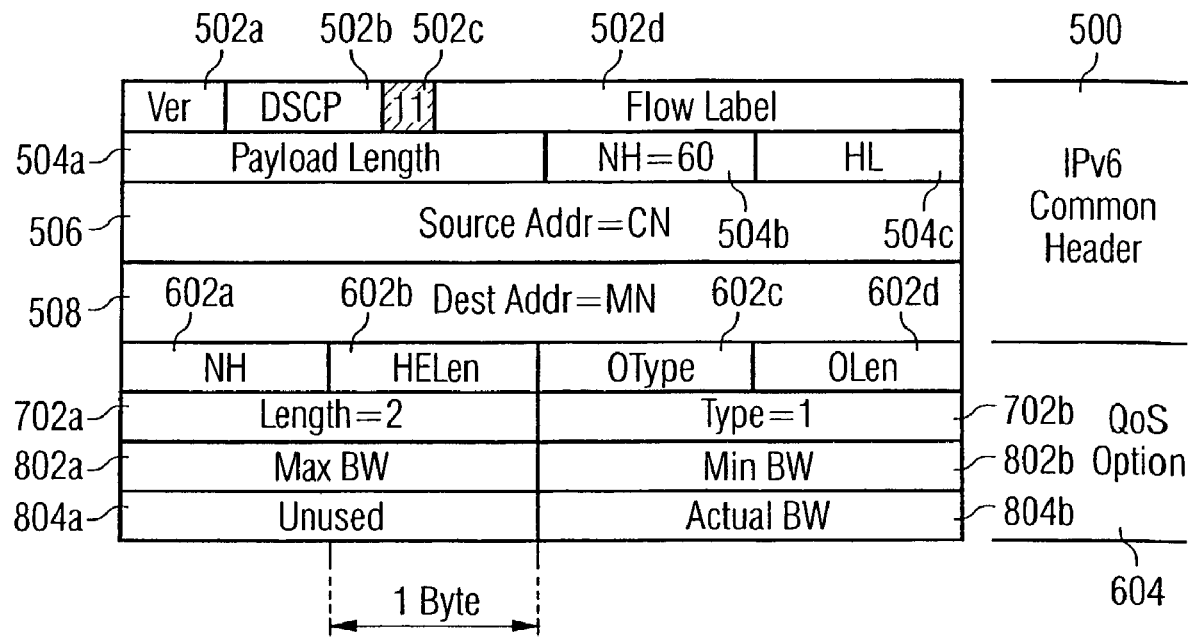
FIG. 24 shows the format of a "handover indication" request, FIG. 25 exhibits a list of potential handover candidates (AP2 and AP3)
Figure 25:
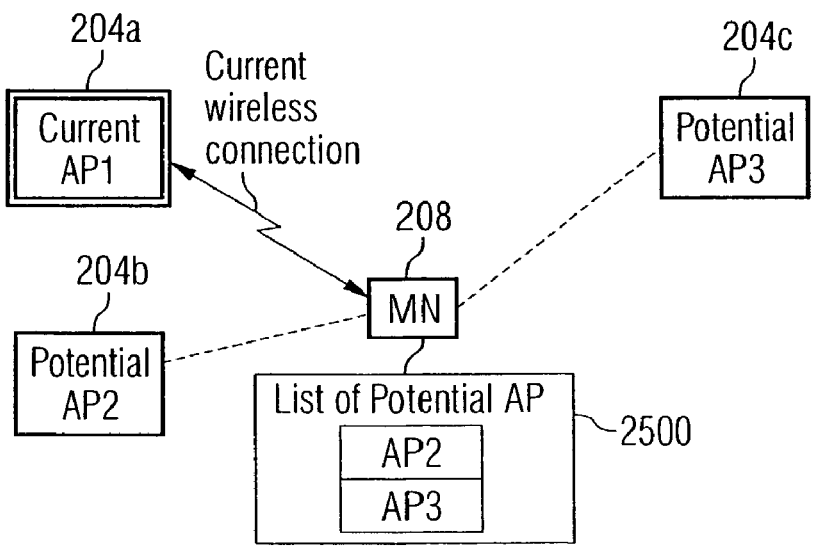

In the following sections, a QoS pre-allocation procedure with a "handover indication" request 2400 and its format as depicted in FIG. 24 shall be described. The associated problem scenario is illustrated in FIG. 23. It shows an example of a MN 208 which is changing its mobile radio cell 202c, thereby moving from its actual access point 204c (AP3) to the potential access points 204a (AP1) or 204b (AP2). In the next step, the MN 208 has to decide which of these handover partners—access point 204a (AP1) or access point 204b (AP2)—will fit best with its QoS needs.

When the MN 208 moves to a new point of attachment, the access handling (e.g. QoS information being passed on) may be insufficient to insure an adequate performance of time-sensitive applications running on the MN 208. During the time of re-negotiations, the applications of the MN 208 are effectively disconnected.

To reduce these delays, a planned handover process 2900 with a feedback to applications as described in "Mobility Related Terminology" (Internet Draft, Internet Engineering Task Force, IETF, July 2001) by J. Manner et al. is introduced. This planned handover 2900 is a proactive (expected) handover where some signaling can be done before the MN 208 gets connected to the new access point 204a/b/c. Thereby, the MN 208 with the involved access routers 206 should be able to perform the following actions:

Allocating resources in advance along the best available QoS path to the new access point 204a/b/c before the handover 2900 itself occurs: In the process of establishing the new forwarding path, the nodes along the new path must be prepared to provide similar forwarding treatment to the IP packets. The QoS information transfer reduces the impact of host mobility on IP services.

Informing running applications about an upcoming handover event 2900.

Announcing the QoS parameters that can be expected after the handover 2900 is finished: This is an essential feature to support adaptive applications.

The "handover indication" request 2400 message is used to set up a "soft reservation" 1200 along a new path segment, which means that a QoS data flow 1102a/b/c can declare its potential QoS capabilities to a new segment of a path that will be used after a handover 2900 has taken place, analyze the QoS situation through a segment of a path, inform all open sessions about an upcoming handover event 2900, inform all open sessions about the QoS parameters that can be expected after the handover 2900 is finished, refresh the reservation since said reservation is defined as soft state 1200.

As shown in FIG. 24, the "handover indication" request 2400 has the following format:

The bits of the RI field 502c are set to "11" to indicate a "handover indication" 2400.

The bandwidth request (BRQ) object 800 consists of one maximum bandwidth (MaxBW) request 802a for a specific QoS data flow 1102a/b/c, one minimum bandwidth (MinBW) request 802b for said QoS data flow 1102a/b/c, and the actual bandwidth 804b (AcBW) is used to report the actual minimum reserved bandwidth 802b for all the hops on the new segment path.

The introduced "handover indication" request 2400 according to the proposed solution of the underlying invention fulfills the need for a pre-allocation of resources. It can be described as follows:

1. The MN 208 is provided with a ranked list of potential access points—204b (AP2) and 204c (AP3)—from its lower layers (cf. FIG. 25).
2. Next, the MN 208 will check the amount of resources along the potential new paths. Thereby, a "soft reservation" state 1200 will be established on each of the potential new links (cf. FIG. 26).
3. Then, the MN 208 will get the feedback information form the potential handover candidates—204b (AP2) and 204c (AP3)—about the actual available amount of resources.
4. After that, the MN 208 decides on one handover candidate (cf. FIG. 27).
5. Moreover, the MN 208 informs the CN 210 about an upcoming handover event 2900 and the parameters of the new link. That gives the CN 210 the possibility to adapt to the new situation (cf. FIG. 28).
6. After the handover preparation, the handover execution 2900 starts. The MN 208 switches from the old access point 204a (AP1) to the new access point—e.g. 204b (AP2)—and changes the "soft reservation" state along a fragment of the path between the access point 204b (AP2) to the intermediate router 206 (IR) to a "hard reservation" state 2000. The unused "soft reservation" and "hard reservation" paths will time out (cf. FIG. 29).
7. Now, the handover 2900 to access point 204b (AP2) is finished, and the "hard reservation" path has been adapted to the new end-to-end path from MN 208 via access point 204b (AP2) to CN 210 (cf. FIG. 30).

Figure 17:
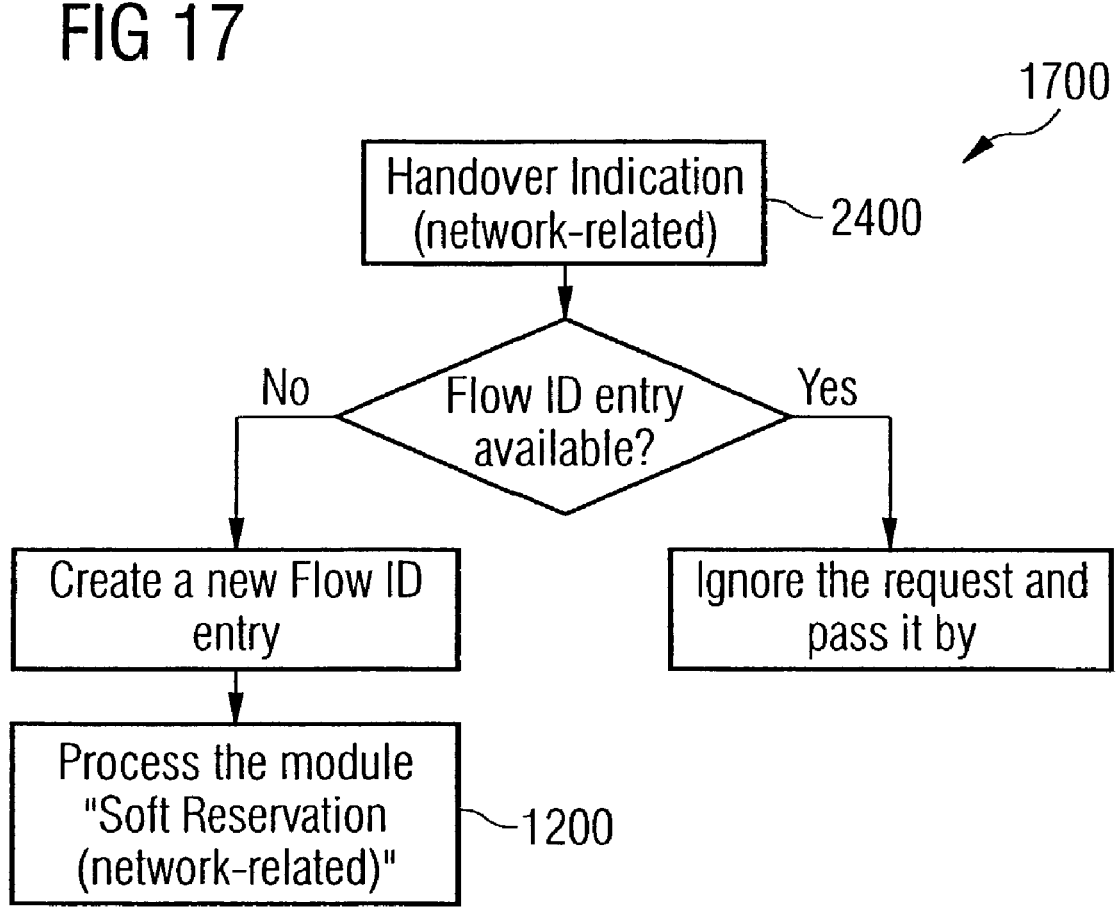

In the following sections, the operation 1700 of the QoS request processing unit 302 shall be described for the case when a "handover indication" request 2400 is reaching an intermediate node 404, which is illustrated in the flowchart depicted in FIG. 17.

When an intermediate node 404 receives a "handover indication" request 2400, it checks an existing flow ID 900 record which is equal to the flow ID 900 related to said "handover indication" request 2400. In case the flow ID 900 of the "handover indication" request 2400 has no entry in the respective intermediate node 404, a new flow ID 900 record with the value of the flow ID 900 of the request is stored in said intermediate node 404, and then the same actions as for a "soft reservation" request 1200 are performed. Otherwise, the "handover indication" request 2400 is ignored in said intermediate node 404.

Figure 18:
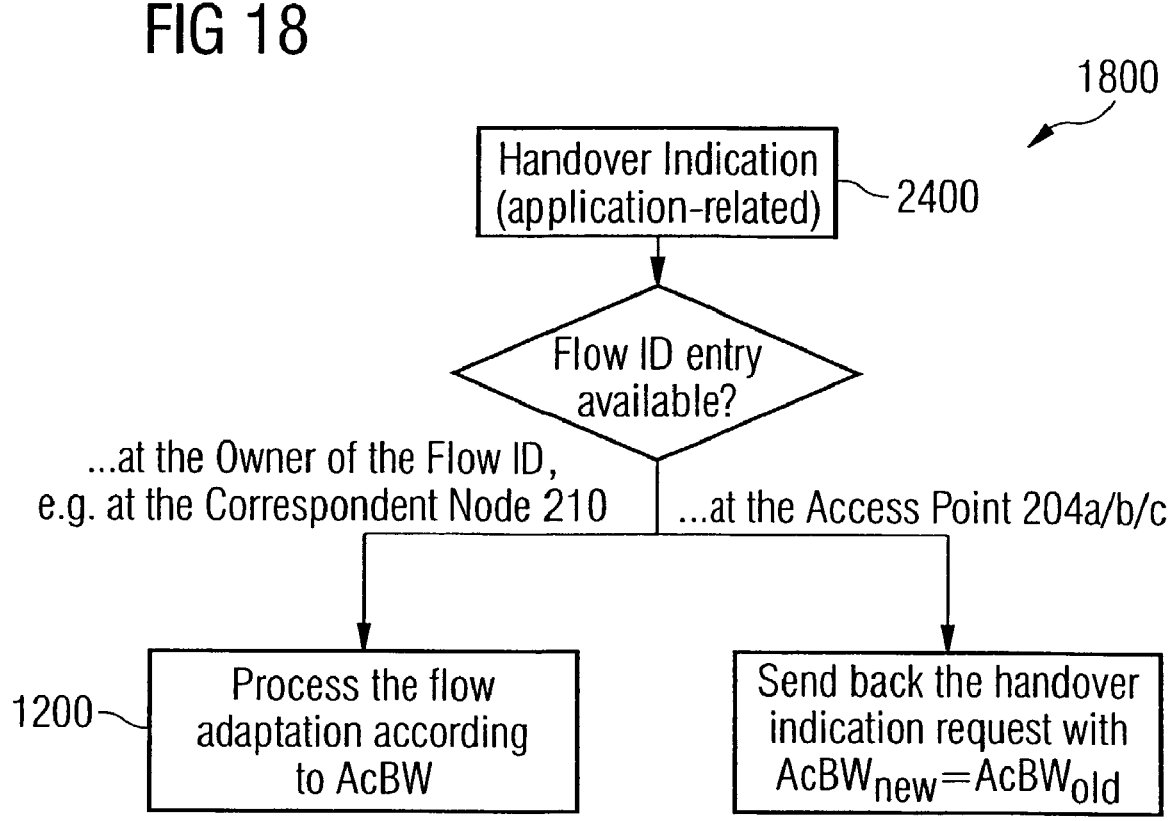

In the following sections, the operation 1800 of the QoS request processing unit 302 shall be described for the case when a "handover indication" request 2400 is reaching the end node 402a/b, which is illustrated in the flowchart depicted in FIG. 18. Thereby, an end node 402a/b may have additional functionality interfacing the application unit 328.

When an end node 402a/b receives a "handover indication" request 2400, it checks if there is an existing flow ID 900 record which is equal to the flow ID 900 related to said request. In case the end node 402a/b is the owner of said flow ID 900 (that means that said end node 402a/b is the sender of the real-time (RT) QoS data flow 1902a/b/c/d), the request is passed on to the upper layers. This gives the applications the possibility to be adapted to an upcoming handover 2900 and to the value of the actual bandwidth (AcBW) field 804b. After the handover 2900 has been processed, said actual bandwidth (AcBW) field 804b will inform the sender node about the current QoS situation. In case the end node 402a/b is not the owner of the flow ID 900, which means that said end node 402a/b could be the potential access point 204b (AP2) or 204c (AP3), the following actions will be performed:

The "handover indication" request 2400 will be returned.
The value of the actual bandwidth (AcBW) field 804b will be kept untouched. The value of said actual bandwidth (AcBW) field 804b can be used to inform the MN 208 about the QoS capabilities along a new potential path.

Table 2 gives an overview about the functionality of the three different types of requests defined in the QoS model.

In the following, the main differences between the proposed solution according to the underlying invention and three already existing technologies according to the state of the art—the INSIGNIA solution, the MRSVP solution and the RSVP solution—shall briefly be summarized.

In contrast to the INSIGNIA solution, the proposed adaptive QoS reservation and pre-allocation (ASAP) model according to the underlying invention is characterized by the following features:

The ASAP QoS model supports a pre-allocation of resources, e.g. in case of a handover procedure 2900.
It offers a mechanism to inform running applications about an upcoming handover event 2900.
Besides, it provides a mechanism to announce QoS parameters that can be expected after the handover 2900 is finished.
Moreover, the ASAP QoS model supports IPv6.
It uses a DS-Field as described in "Definition of the Differentiated Services (DS) Field in the IPv4 and IPv6 Headers" (IETF RFC 2474, December 1998) by K. Nichols, S. Blake, F. Baker and D. Black to define the type of different QoS requests.
Finally, the ASAP QoS model offers a mechanism to reduce the processing load on the intermediate routers 206 (IRs).

In contrast to the MRSVP solution, the proposed adaptive QoS reservation and pre-allocation (ASAP) model according to the underlying invention is characterized by the following features:

The ASAP QoS model is able to dynamically establish selected reservations to well-defined locations. In comparison, in MRSVP a mobile host makes a passive reservation to all other locations it might visit.
Furthermore, the ASAP QoS model has no restrictions with regard to mobility aspects. By contrast, MRSVP permits both the sender and/or the receiver of a QoS data flow 1102a/b/c to be mobile.
Besides, the ASAP QoS model is able to change QoS-specifications in an adaptive and dynamic way, while MRSVP permits dynamic changes of said QoS specifications.
The ASAP QoS model has no access limitations for "soft" reserved bandwidth 1302a. Thereby, all kinds of QoS data flows 1102a/b/c are able to use "soft" reserved bandwidth 1302a. By contrast, MRSVP allows that the bandwidth of the passive reservations (comparable with "soft reservation") can be used by other QoS data flows 1102a/b/c that might require weaker QoS guarantees or best-effort services.

In contrast to the RSVP solution, the proposed adaptive QoS reservation and pre-allocation (ASAP) model according to the underlying invention is characterized by the following features:

The ASAP QoS model offers a mechanism for a fast adaptation of QoS changes.

Moreover, the ASAP QoS model supports a pre-allocation of resources, e.g. in case of a handover procedure 2900. It provides a mechanism to inform running applications about an upcoming handover event 2900.

Besides, the ASAP QoS model offers a mechanism to announce QoS parameters that can be expected after the handover 2900 is finished.

Finally, the ASAP QoS model offers a mechanism to reduce the processing load on the IRs 206.

In the following sections, some examples shall be given to illustrate possible applications of the proposed QoS management unit in the scope of said ASAP QoS model according to the underlying invention.

FIG. 31 illustrates an example of a handover scenario 2900 wherein the proposed QoS management unit 304 is applied. In this example, a first end node unit 402a is communicating with a second end node unit 402b via a first intermediate node 404 (designated with #1) and a second intermediate node 404 (designated with #2.1). Thereby, said second end node unit 402b is actually moving into the access coverage of a third intermediate node 404 (designated with #2.2). To provide a new communication path and to get the QoS information which is needed to initiate a handover 2900, the QoS management unit 304 of the second end node unit 402b has to interact with the QoS management unit 304 of the third intermediate node 404 (#2.2).

Each intermediate node 404 supporting the ASAP QoS model comprises several QoS-related records forming a so-called "QoS table" 3200 as depicted in FIG. 32. Thereby, each QoS data flow 1102a/b/c is treated according to its specific QoS record. A record in the "QoS table" 3200 will be created in response to the first appearance of a new flow ID 900. This record consists of the flow label field 902b, the source address field 904, the "hard reservation" field 1302b, the "soft reservation" field 1302a and the indicator field 3201. Thereby, the flow label field 502d and the source address field 506 are copied form the IPv6 header 500 information 500, the "hard reservation" field 1302b and the "soft reservation" field 1302a are set to zero, and the entry of the indicator field 3201 is set to "No". In this context, the flow label 502d along with its source address 506 creates a unique flow ID 900 which can advantageously be used to identity a unique QoS data flow 1102a/b/c.

In the following chapter, four examples of QoS-specific operations supported by the proposed QoS model shall briefly be described—QoS reservation, monitoring, reporting and adaptation:

In order to establish an adaptive real-time (RT) QoS data flow 1902a-d, respectively, the following actions are performed:

First, a source node 402a sets the "soft reservation" bit pattern ("01") in the reservation indicator (RI) field 502c of the IPv6 header 500 of a data packet to initiate a "soft reservation" request 1200.

Having received said "soft reservation" request 1200, the intermediate nodes 404 check if there are entries related to the specific QoS data flow 1102a/b/c.

In case a "soft reservation" request 1200 is received and no resources have been allocated, the admission controller immediately attempts to make a "soft reservation" 1200.

Next, the amount of the actual bandwidth ($AcBW_{old}$) indicated by the AcBW field 804b will be compared to the amount of the actually available bandwidth 1304 (AvBW). The minor amount will then be stored into the AcBW field 804b, as can be taken from the following equation:

$$AcBW_{new} := Min\{AvBW; AcBW_{old}\}$$

(with $AcBW_{old} = AcBW$).

Meanwhile, the source node 402a continues to send "soft reservation" request packets 1200 until the destination node 402b informs it about the QoS situation along the connection path 200.

Thereby, subsequent "soft reservation" request packets 1200 do not execute admission control, but simply refresh existing soft-state reservation.

Next, the destination node 402b inspects the AcBW field 804b. In case the amount of bandwidth stored in the AcBW field 804b is bigger than the amount of bandwidth stored in the MinBW field 802b, said destination node 402b will send a "hard reservation" request 2000 to the sender node 402a with the amount of the bandwidth stored in the AcBW field 804b.

Intermediate nodes 404 will react to a "hard reservation" request 2000 by changing the soft state entry 1302a for the specific flow ID 900 to a hard state entry 1302b. The amount of the bandwidth 1302b that will be turned to hard state 2000 is taken from the AcBW field 804b.

Periodically sent "soft reservation" requests 1200 are used for two reasons: to refresh the soft state entry 1302a along the IRs 206 and/or to monitor the QoS situation. In the latter case, end nodes 402a/b and/or intermediate nodes 404 actively monitor on-going QoS data flows 1102a/b/c by inspecting the AcBW field 804b. If the amount of bandwidth stored therein differs from the expected amount, said nodes 402a/b or 404 can inform the CN 210 about the change of the QoS status along the path and/or start an adaptation process by sending a redefined "hard reservation" request 2000 based on the information stored in the AcBW field 804b.

FIG. 33 shows an example of a QoS monitoring, reporting and adaptation process. In the following, the five steps of said process shall be described in detail.

Step 1: At the beginning, a first "soft reservation" request 1200 (designated with "1") is sent from the CN 210 to the MN 208 in order to establish an adaptive real-time (RT) QoS data flow 1902a/b/c/d. Having received said message, each IR 206 creates a new entry for this QoS data flow 1102a/b/c in its "QoS table" 3200 and reserves bandwidth according to said first "soft reservation" request 1200 (1). After that, the AcBW field 804b of the "soft reservation" request message 1200 (1) is adjusted to the minimum reserved bandwidth (MinBW) throughout the path as defined in the MinBW field 802b. At the second intermediate node 404, the actual available bandwidth 1304 is below the bandwidth request 800 (BRQ). Therefore, the AcBW field 804b will be updated with the value of the actual available bandwidth 1304 (AvBW). This indicates the reserved bandwidth to the following entities on the end-to-end path. The MN 208 will then identify said first "soft reservation" request 1200 (1) as a SETUP message, and inform its application unit 328 about this event.

Step 2: The MN 208 is sending a first "hard reservation" request 2000 (designated with "2") back to the CN 210 to "hard reserve" bandwidth along the end-to-end path. The CN 210 will then identify said first "hard reservation" request 2000 (2) and adjust the QoS parameters. Furthermore, it will inform its application unit 328 about this event.

Step 3: A second "soft reservation" request 1200 (designated with "3") is sent from the CN 210 the MN 208. The bandwidth situation has not changed along the end-to-end path. Then, the MN 208 will analyze said second "soft reservation" request 1200 (3). Owing to the fact that there has not been any state change 1900, no action has to be taken.

Step 4: A third "soft reservation" request 1200 (designated with "4") is sent from the CN 210 the MN 208. Now, the bandwidth situation has changed along the end-to-end path. At the second intermediate node 404, the actual available bandwidth (AvBW) 1304 has increased. The mobile network will then analyze said third "soft reservation" request 1200 (4). A change in the AcBW field 804b will be detected. Moreover, the MN 208 will inform its application unit 328 about the increased bandwidth situation.

Step 5: The MN 208 is sending a second "hard reservation" request 2000 (designated with "5") back to the CN 210 in order to increase the "hard" reserved bandwidth along the end-to-end path. The CN 210 will then identify said second "hard reservation" request 2000 (5) and adjust the QoS parameters. Finally, it will inform its application unit 328 about the increased bandwidth situation.

During session termination, the affected applications have to be informed to end the session. To remove the reservation entries along the path, a "hard reservation" request 2000 with a demand for a "zero" bandwidth is used.

Figure 34:
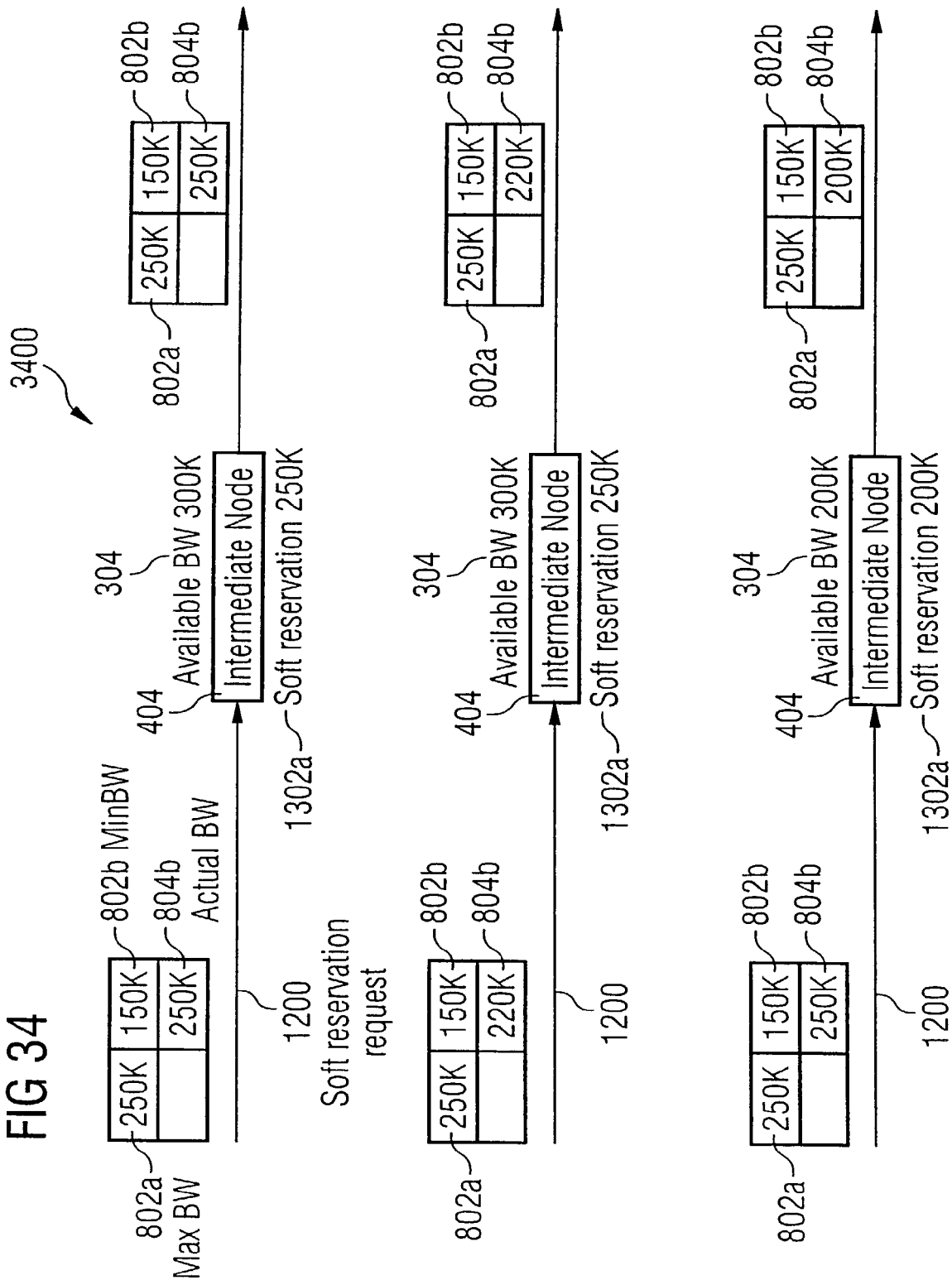
FIG. 34 shows an example of a bandwidth request (BRQ) processing on an intermediate node.

In the following sections, three cases of a "soft reservation" request 1200 reaching an intermediate node 404 the first time shall be described as depicted in FIG. 34. In this context, it shall be assumed that said intermediate node 404 does not comprise any flow ID entry 900.

1. In case the request for the bandwidth stored in the MaxBW field 802a is lower than the available bandwidth 1304 (AvBW) of said intermediate node 404, a "soft reservation" entry 1302a reflecting the request for said maximum bandwidth (MaxBW) is stored in the respective intermediate node 404. If the amount of the "soft" reserved bandwidth 1302a is equal or bigger than the demand for the AcBW field 804b, the AcBW field 804b is kept untouched.
2. In case the value of the AcBW field 804b is lower than the request for the bandwidth stored in the MaxBW field 802a, the same actions as in case 1 will be performed.
3. In case the request for the bandwidth stored in the MaxBW field 802a is higher than the available bandwidth 1304 within the respective intermediate node 404, the following actions will be performed:
   A "soft reservation" entry 1302a which reflects the amount of the available bandwidth 1304 (AvBW) is stored in the respective intermediate node 404.
   If the amount of the actually reserved bandwidth AcBW stored in the AcBW field 804b is higher than the available bandwidth 1304 (AvBW), the amount of the bandwidth stored in the AcBW field 804b will be reduced to the amount of the actual available bandwidth 1304 (AvBW).

In general, the "soft reservation" 1200 has the following behavior:

The IR 206 checks the MaxBW field 802a, and processes the "soft" resource reservation 1200. In case the available resources within the intermediate node 404 exceed the MaxBW requirement, the maximum bandwidth stored in the MaxBW field 802a will be reserved and the AcBW field 804b will be kept untouched. Otherwise, the amount of the actual available bandwidth 1304 (AvBW) will be reserved and the amount of the reserved bandwidth indicated by the value stored in the AcBW field 804b will be compared with the amount of the actual available bandwidth 1304 (AvBW). The minor amount will be stored into the AcBW field 804b. This will indicate the reserved bandwidth to the following entities on the end-to-end path.

In conclusion, some advantages of an adaptive QoS reservation using a resource pre-allocation according to the proposed QoS model of the underlying invention shall briefly be summarized:

Adaptation and restoration mechanism: Said QoS model is an in-band signaling system that is able to support fast reservation, restoration and adaptation algorithms.

QoS report: Within said QoS model, adaptive applications are provided with actual link quality information.

Adaptation: The monitoring and signaling function is the basis for adaptive and responsive actions performed by the applications.

Resource pre-allocation: A pre-allocation of resources in case of handover scenarios 2900 supports an unopposed continuation of real-time (RT) QoS data flows 1102a/b/c.

"Handover indication": Running applications can be informed about upcoming handover events 2900 with the aid of so-called "handover indications" 2400.

"Soft"/"hard" reservation: These reservations allow saving bandwidth due to the underlying concepts of "soft reservation" 1200 and "hard reservation" 2000, respectively.

Scalability: Compared to other per-flow state protocol solutions, e.g. the Resource Reservation Setup Protocol (RSVP), the proposed QoS model provides an improved solution by using an in-band signaling procedure without separate set-up and tear-down procedures.

Soft-state management: Reservations time out unless data are sent that use said reservations. Therefore, no explicit "tear-down" message is required. This behavior is essential for wireless networks. Furthermore, it can be assumed that unused reservations are the result of link connection problems up to lost connections of the mobile device. Thereby, soft-state management has a "self cleaning" effect to the network by avoiding "dead" QoS link reservations.

Independence of the Media Access Control (MAC) layer: The proposed QoS model consists of a framework which operates at the network layer. Thereby, it is assumed that link status sensing and access schemes are provided by lower layer entities. Said framework depends on MAC layers, but since this is undefined, it may run by using any MAC layer technology.

TABLE 1

Sub-units of the QoS management unit

| Sub-Unit | Brief Explanation |
|---|---|
| QoS request analysis unit 306 | This unit evaluates a QoS request to inform the application unit 328 about the current QoS situation, or passes it on to the next QoS management unit 304. |
| Soft state controlling unit 308 | This unit controls the soft state 1200 associated with the "soft reservation" unit 316a. A soft state entry 1302a exists only as long as periodic refresh messages are received by the soft state controlling unit 308. |

TABLE 1-continued

Sub-units of the QoS management unit

| Sub-Unit | Brief Explanation |
|---|---|
| QoS parameter storage unit 310 | This unit stores QoS parameter settings and checks them on behalf of other units. |
| QoS request processing unit 312 | This unit manages "request messages" for each type of QoS request on behalf of input signals coming from the QoS request analysis unit 306, the QoS parameter storage unit 310 and/or the QoS monitoring unit 318. |
| Handover management unit 314 | This unit manages "handover indication" request messages 2400. It comprises three sub-units: the resource pre-allocation unit 314a, the "handover indication" unit 314b and the QoS parameter information unit 314c. |
| Resource preallocation unit 314a | This unit manages a "soft reservation" 1200 along a new path segment. This means that a QoS data flow 1102a/b/c can declare its potential QoS capabilities to a new segment of a path that will be used after a handover 2900 has taken place. It also analyzes the QoS situation through a segment of a path. |
| "Handover indication" unit 314b | This unit informs all open sessions about an upcoming handover event 2900. It is only necessary within the end nodes 402a/b. |
| QoS parameter information unit 314c | This unit informs all open sessions that are possibly influenced by an upcoming handover 2900 about the QoS parameters which can be expected after the handover 2900 is finished. Said unit is only necessary within the end nodes 402a/b. |
| "Soft reservation" unit 316a | This unit manages "soft reservation" requests 1200 for specific QoS data flows 1102a/b/c. QoS capabilities (e.g. a certain amount of bandwidth) can be defined as "soft" reserved capabilities 1302a. With the aid of this functionality, a specific QoS data flow 1102a/b/c can declare its potential future demand for QoS capabilities 1302a. |
| "Hard reservation" unit 316b | This unit manages "hard reservation" requests 2000 for specific QoS data flows 1102a/b/c. QoS capabilities (e.g. a certain amount of bandwidth) can be defined as "hard" reserved capabilities 1302b. "Hard reservation" 2000 is exclusively assigned to a specific QoS data flow 1102a/b/c with well-defined QoS capabilities 1302b for the data packet exchange. With the aid of this functionality, a specific QoS data flow 1102a/b/c reserves its demand for QoS capabilities 1302b. |
| QoS monitoring unit 318 | This unit monitors the current QoS situation within the MN 208. It informs the QoS reporting unit 320 about QoS-related state changes 1900. Furthermore, it initiates requests by activating the QoS request processing unit 312. |
| QoS reporting unit 320 | This unit generates a QoS report on behalf of input signals received from the hand-over management unit 314 and/or the QoS monitoring unit 318, and transfers it to the QoS application interface unit 324. |
| QoS request generation unit 322 | This unit generates a QoS request on behalf of input signals coming from the QoS request processing unit 312, or passes it on according to a result received from the QoS request analysis unit 306. |
| QoS application interface unit 324 | This unit is the interface to the application unit 328. |
| QoS network interface unit 326 | This unit is the interface to the network unit 302. It transfers the input coming from the QoS request processing unit 312 to the network unit 302. |

TABLE 2

Functionality of the "Hard Reservation", "Soft Reservation" and "Handover Indication" Request

| Message → Functionality ↓ | "Hard Reservation" Request 2000 | "Soft Reservation" Request 1200 | "Handover Indication" Request 2400 |
|---|---|---|---|
| General functionality of the message | To "hard" reserve QoS parameters on a specific communication link. | To "soft" reserve QoS parameters on a specific communication link. | To "soft" reserve QoS parameters on a new communication link in handover situations 2900. |
| | To change QoS parameters on the link. | To update a soft-state timer. | To monitor the QoS parameters along the new path. |
| | To remove QoS parameters on the link. | To monitor the QoS parameters along the path. | To inform the owner of a flow ID 900 about an upcoming handover situation 2900. To inform the sender about the QoS parameters that will be available after the handover 2900. |
| Ignoring a request according to the state of the indication bit 3201 | No | Yes | No |
| Possibility to change the state of the indication bit 3201 | Yes | Yes | Yes |
| Processing load on the node in case of receiving a message | High - each request has to be analyzed. | Low - processing has to be performed only if the indication bit 3201 is set to "No". | High - each request has to be analyzed. |
| Frequency of sending a message | Only in case of QoS adaptation. | Periodically sending during the live time of a specific QoS data flow 1102a/b/c. | Only in cases of pre-allocation and handover notification to the owner of the flow ID 900. |
| Monitoring bandwidth information along the path | Yes | Yes | Yes |
| Type of reservation initiated by a request | "hard reservation" | "soft reservation" | "soft reservation" |
| Demand to confirm a request | Yes, in case the request could not be fulfilled. | No | Yes, by the potential access point 204a/b/c in case of pre-allocation of specific resources on a new link. |
| Current update of said soft-state timer | Yes | Yes | Yes |

The invention claimed is:

1. A quality-of-service (QoS) management unit of a mobile terminal connected to a wireless network which is designed to support multimedia services running on said mobile terminal to dynamically adapt to time-varying link characteristics of the underlying mobile radio channel, comprising the following sub-units:
   at least one analysis unit which evaluates QoS requests received from other nodes to inform an application unit of said mobile terminal about the current QoS situation,
   at least one processing unit for managing request messages for each type of QoS request on behalf of input signals received from the analysis unit, a monitoring unit and/or further sub-units of said QoS management unit,
   at least one monitoring unit which monitors the current QoS situation within said mobile node, and initiates requests by activating the processing unit, and
   at least one generation unit which generates QoS requests on behalf of the processing unit, or passes them on to the QoS management units of other nodes according to input signals received from the analysis unit.

2. A quality-of-service (QoS) management unit according to claim 1, wherein said at least one processing unit includes at least one handover management unit which is responsible for the management of handover indication request messages.

3. A quality-of-service (QoS) management unit according to claim 1, wherein said at least one processing unit includes at least one reservation unit which manages reservation requests for specific QoS data flows to satisfy their demand for effective bandwidths, network resources and/or specific QoS capabilities.

4. A quality-of-service (QoS) management unit according to claim 1, further comprising:
   at least one handover management unit including
   at least one resource pre-allocation unit which analyzes the QoS situation through a new segment of a path, and manages a soft reservation along said path segment in such a way that a QoS data flow is able to declare its potential QoS capabilities and bandwidth requirements to a new segment of a path that will be used after a handover has taken place;
   at least one handover indication unit which informs all open sessions about an upcoming handover event; and
   at least one QoS parameter information unit which informs all open sessions that are possibly influenced by an upcoming handover about the QoS parameters which can be expected after the handover is finished.

5. A quality-of-service (QoS) management unit according to claim 1, further comprising:
   at least one reservation unit including at least one soft reservation unit that manages "soft reservation" requests in order to satisfy bandwidth requirements and/or to provide network resources and/or specific QoS capabilities for specific QoS data flows.

6. A quality-of-service (QoS) management unit according to claim 1, further comprising:
   at least one reservation unit including at least one hard reservation unit that manages "hard reservation" requests in order to exclusively satisfy bandwidth requirements and/or to provide network resources and/or specific QoS capabilities for one specific QoS data flow.

7. A quality-of-service (QoS) management unit according to claim 1, further comprising:
   at least one storage unit which stores QoS parameter settings and checks them on behalf of other sub-units of said QoS management unit.

8. A quality-of-service (QoS) management unit according to claim 1, further comprising;
   at least one reporting unit which generates QoS reports on behalf of handover indication requests received from the handover management unit and/or possible QoS-related state changes detected by the monitoring unit, and transfers it to the application unit of said mobile terminal.

9. A quality-of-service (QoS) management unit according to claim 1, further comprising:
   at least one soft state controlling unit which controls soft state entries associated with the soft reservation unit.

10. A method for operating a QoS management unit according to claim 2, wherein the handover indication requests managed by said handover management unit are applied to "soft" reserve QoS parameters on a new communication link in case of handover situations, to monitor the QoS parameters along the new communication link, and/or to inform the owner of a specific flow ID and the mobile terminal about an upcoming handover situation and QoS parameters that will be available after said handover event is finished.

11. A method for operating a QoS management unit according to claim 5, wherein the soft reservation requests managed by said soft reservation unit are applied to "soft-"reserve, update and monitor the QoS parameters along a specific communication link.

12. A method for operating a QoS management unit according to claim 6, wherein the hard reservation requests managed by said hard reservation unit are applied to "hard" reserve, change or remove predefined QoS parameters on a specific communication link.

* * * * *